(12) United States Patent  
Yoneyama

(10) Patent No.: US 8,498,063 B2  
(45) Date of Patent: Jul. 30, 2013

(54) TELEPHOTO LENS SYSTEM

(75) Inventor: Shuji Yoneyama, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 13/177,774

(22) Filed: Jul. 7, 2011

(65) Prior Publication Data

US 2012/0057250 A1  Mar. 8, 2012

(30) Foreign Application Priority Data

Sep. 8, 2010 (KR) .................. 10-2010-0088052

(51) Int. Cl.
*G02B 13/02* (2006.01)
*G02B 9/14* (2006.01)
(52) U.S. Cl.
USPC .......................................... 359/748; 359/785
(58) Field of Classification Search
USPC ............. 359/745–748, 754–758, 763, 764, 359/766, 771–774, 784, 785
See application file for complete search history.

(56) References Cited

U.S. PATENT DOCUMENTS

| | | | |
|---|---|---|---|
| 6,115,188 A | 9/2000 | Nishio et al. | |
| 6,381,079 B1* | 4/2002 | Ogawa | ........................... 359/795 |
| 2007/0279764 A1* | 12/2007 | Hoshi | ........................... 359/687 |
| 2009/0190239 A1 | 7/2009 | Suzuki | |
| 2010/0231781 A1* | 9/2010 | Lee | ............................... 348/345 |

FOREIGN PATENT DOCUMENTS

| | | |
|---|---|---|
| JP | 59-048723 A | 3/1984 |
| JP | 03-200909 A | 9/1991 |
| JP | 05-157964 A | 6/1993 |
| JP | 07-199066 A | 8/1995 |
| JP | 2000-347099 A | 12/2000 |
| KR | 1020090111221 A | 10/2009 |

OTHER PUBLICATIONS

Search Report established for GB 1114804.6 (Dec. 30, 2011).

* cited by examiner

*Primary Examiner* — Darryl J Collins
(74) *Attorney, Agent, or Firm* — Drinker Biddle & Reath LLP

(57) ABSTRACT

A telephoto lens system including a first lens group having a positive refractive power and including at least three positive lenses and one negative lens; a second lens group having a negative refractive power and for performing focusing by moving along an optical axis; and a third lens group having a positive refractive power and including a 3a sub-lens group with positive refractive power and a 3b sub-lens group), wherein the 3a sub-lens group includes a negative lens and a positive lens sequentially arranged from an object side d, the 3b sub-lens group includes a positive lens and a negative lens sequentially arranged from the object side, and the telephoto lens system satisfies a condition, 0.17<fb/f<0.35, where, fb indicates a back focal length in air without a filter, that is, a distance from a lens surface of the telephoto lens system closest to the image side to an imaging surface with respect to the telephoto lens system having an optical arrangement at an infinite object position in air without the filter, and f indicates an overall focal length of the telephoto lens system.

9 Claims, 43 Drawing Sheets

TELEPHOTO LENS SYSTEM

CROSS-REFERENCE TO RELATED PATENT APPLICATION

This application claims the benefit of Korean Patent Application No. 10-2010-0088052, filed on Sep. 8, 2010, in the Korean Intellectual Property Office, the disclosure of which is incorporated herein in its entirety by reference.

BACKGROUND

1. Field of the Invention

The invention relates to an inner-focusing type telephoto lens system used in a digital still camera or a digital video camera.

2. Description of the Related Art

Recently, digital cameras or video cameras having a solid-state imaging device, such as charge-coupled devices (CCDs) and complementary metal-oxide semiconductors (CMOS), are becoming very popular.

In a video camera or a digital camera, bright telephoto lenses with small F numbers are preferred. However, such bright lenses are relatively large and heavy, and thus auto-focusing cameras experience slow focusing with such lenses.

Although various focusing mechanisms have been suggested to resolve the slow focusing, none of them may provide both sufficient brightness and sufficient weight reduction at the same time. For example, a bright telephoto lens with an F number of 1.4 includes a focus lens group having 5 lenses. However, due to such a large number of lenses, the telephoto lens provides insufficient weight reduction. On the other hand, a telephoto lens with a relatively reduced weight includes a small number of lenses, for example, one or two lenses, exhibits a relatively high F number, e.g., about 2, and thus the telephoto lens provides insufficient brightness.

Furthermore, due to recently increasing demands for image quality, effects of hand shakes are not negligible, and thus demands for hand shake correction are increasing. However, lenses in F1.4 class do not have a hand shake correction feature.

SUMMARY

An embodiment of the invention provides a bright telephoto lens system including a focusing lens group with a reduced weight.

According to an embodiment of the invention, there is provided a telephoto lens system including a first lens group having a positive refractive power and including at least three positive lenses and one negative lens; a second lens group having a negative refractive power and for performing focusing by moving along the optical axis; and a third lens group having a positive refractive power and including a 3a sub-lens group with positive refractive power and a 3b sub-lens group, wherein the 3a sub-lens group includes a negative lens and a positive lens sequentially arranged from an object side, the 3b sub-lens group includes a positive lens and a negative lens sequentially arranged from the object side, and the telephoto lens system satisfies the condition, $0.17<fb/f<0.35$, where, fb indicates the back focal length in air without a filter, that is, the distance from the lens surface of the telephoto lens system closest to the image side to the imaging surface with respect to the telephoto lens system having an optical arrangement at an infinite object position in air without the filter, and f indicates the overall focal length of the telephoto lens system.

The second lens group may include a doublet lens formed by adhering a positive lens and a negative lens to each other. Alternatively, the second lens group may include a negative lens.

The telephoto lens system may satisfy the condition, $0.50<f/f3a<2.00$, where f indicates the overall focal length of the telephoto lens system, and f3a indicates the focal length of the 3a sub-lens group.

The telephoto lens system may satisfy the condition, $-3.00<f/f3b\_n<-0.25$, where f indicates the overall focal length of the telephoto lens system, and f3b_n indicates the focal length of the negative lens in the 3b sub-lens group of the third lens group.

The telephoto lens system may satisfy the condition, $-3.00<\phi 3b\_n\times f<-0.30$, where f indicates the overall focal length of the telephoto lens system and $\phi 3b\_n$ indicates the refractive power of the surface of the negative lens of the 3b sub-lens group of the third lens group having a relatively high negative refractive power and $\phi 3b\_n$ is defined as follows:

$$\phi 3b\_n = -|(n3\_n-1)/r3b|$$

where, n3_n indicates the refractive index of the negative lens of the 3b sub-lens group, and R3b indicates the radius of curvature of the surface of the negative lens of the 3b sub-lens group of the third lens group having the relatively high negative refractive power.

A surface of a lens of the third lens group closest to the object side may have a shape convex toward the object side.

The 3a sub-lens group may move in a direction crossing the optical axis to correct hand shakes.

The negative lens and the positive lens of the 3a sub-lens group may form a doublet lens, and the 3a sub-lens group may further include a negative lens arranged in the image side of the doublet lens.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
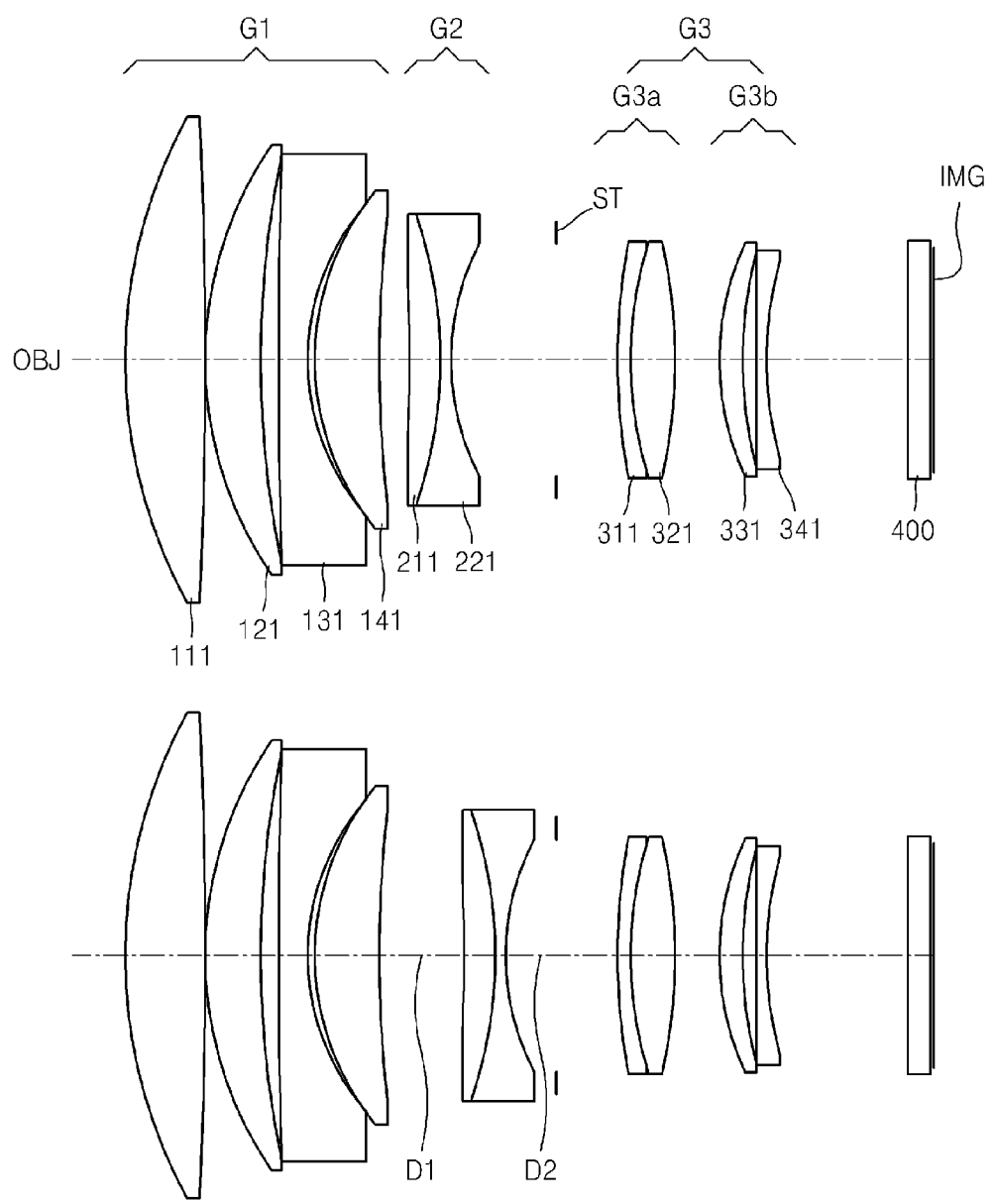
FIG. 1 shows optical arrangements of a telephoto lens system according to a first embodiment of the invention at an infinite object position and at a closest object position.

Hereinafter, the invention will be described in detail by explaining preferred embodiments of the invention with reference to the attached drawings. In the drawings, the thicknesses of layers and regions are exaggerated for clarity. Like reference numerals in the drawings denote like elements.

FIGS. 1, 9, 16, 23, 30, and 37 are diagrams respectively showing optical arrangements of telephoto lens systems according to first through sixth embodiments of the invention at infinite object positions and at closest object positions.

A telephoto lens system according to an embodiment of the invention includes a first lens group G1 having a positive refractive power, a second lens group G2 having a negative refractive power and for performing focusing by moving along the optical axis, and a third lens group G3 having a positive refractive power, wherein the first through third lens groups G1 through G3 are sequentially arranged from an object side. The third lens group G3 includes a 3a sub-lens group G3-*a* and a 3b sub-lens group G3-*b*. The first lens group G1 includes at least three positive lenses and at least one negative lens. The second lens group G2 includes a doublet lens formed of a positive lens and a negative lens, or one negative lens. In the third lens group G3, the 3a sub-lens group G3-*a* includes a negative lens and a positive lens sequentially arranged from the object side, whereas the 3b sub-lens group 3G-b includes a positive lens and a negative lens sequentially arranged from the object side. An iris ST is arranged between the second lens group G2 and the third lens group G3, and the surface of the lens of the third lens group G3 closest to the object side, that is, the surface of the lens just next to the iris ST, has a shape convex toward the object side. A filter 400 is arranged between the third lens group G3 and an image surface IMG.

Telephoto lens systems according to embodiments of the invention satisfy Condition 1 below.

$$0.17<fb/f<0.35$$ [Condition 1]

Here, fb indicates the back focal length in air without the filter 400, that is, the distance from the lens surface of the telephoto lens system closest to the image side to the imaging surface IMG with respect to the telephoto lens system having an optical arrangement at an infinite object position in air without the filter 400, and f indicates the overall focal length of the telephoto lens system.

Condition 1 defines a range of back focal lengths, and, since the position of the third lens group G3 is set based on Condition 1, Condition 1 helps with correction of aberrations and configuration of a means of correcting hand shakes described later.

Figure 2A:
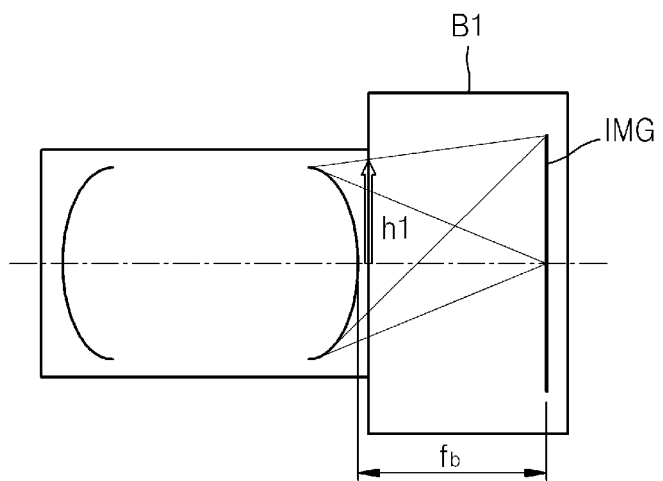
FIGS. 2A and 2B are diagrams for describing heights of incident light when applying a telephoto lens system to a camera body B1 with an optical viewfinder and when applying a telephoto lens system to a camera body B2 without an optical viewfinder, respectively.
Figure 2B:
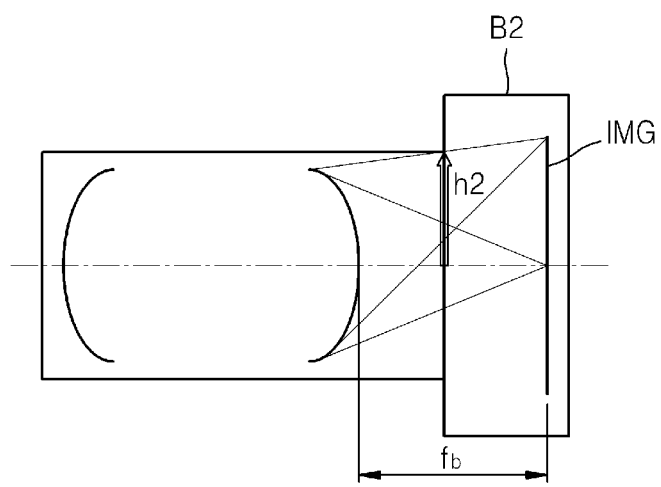

The range of back focal lengths defined in Condition 1 is narrower than the range of back focal lengths that may be applied to cameras with optical finders, e.g., single lens reflex (SLR) type cameras, and thus the range of back focal lengths defined in Condition 1 is suitable for cameras without optical finders. Due to recent digitization of cameras, more cameras use digital viewfinders instead of optical viewfinders. In this case, it is not necessary to increase the back focal length as compared to optical viewfinders. FIGS. 2A and 2B are diagrams for describing heights of incident light when applying a telephoto lens system to a camera body B1 with an optical viewfinder and when applying a telephoto lens system to a camera body B2 without an optical viewfinder, respectively. The camera body B1 with an optical viewfinder requires a space for arranging mirrors to direct light to the optical viewfinder, and thus the thickness of the camera body B1 is greater than that of the camera body B2 without an optical viewfinder. Therefore, when telephoto lens systems with the same back focal length, for example, a back focal length fb, are respectively applied to the camera body B1 with an optical viewfinder and the camera body B2 without an optical viewfinder, an exit pupil is located relatively far in the case where a telephoto lens system is applied to the camera body B2 without an optical viewfinder, and thus a height h2 of light entered into the camera body B2 is greater than a height h1 of light entered into the camera body B1. In this case, the diameter of the unit for coupling the lens and the camera may increase, and thus the camera may become relatively large overall.

At short back focal lengths less than the minimum of the range defined in Condition 1, it is difficult to arrange units including a filter or a shutter in front of an imaging device. At long back focal lengths exceeding the maximum of the range defined in Condition 1, the overall length of the lens system is set based on a focal length restricted by the telephoto ratio and the overall length of the lens system decreases. In this case, it is difficult to arrange a unit for correcting hand shakes within the lens system.

Furthermore, the telephoto lens systems according to embodiments of the invention may satisfy Condition 2 below.

$$0.50<f/f3a<2.00$$ [Condition 2]

Here, f indicates the overall focal length of the telephoto lens system, and f3a indicates the focal length of the 3a sub-lens group G3-*a*.

Condition 2 defines the refractive power of the 3a sub-lens group G3-*a* of the third lens group G3. The 3a sub-lens group G3-*a* is the lens group arranged just next to the iris ST and has a positive refractive power. In case of a conventional double gauss type lens system, a lens group having a negative refractive power due to a significantly concave surface is arranged just next to the iris ST, so that spherical aberration and comma aberration due to a relatively large diameter of the lens system are corrected by the negative refractive power. However, in such an arrangement, the height at which light enters into the camera body increases. In the present embodiment, the 3a sub-lens group G3-*a* having a positive refractive power is arranged just next to the iris ST to lower the height at which light enters into the camera body.

If the refractive power of the 3a sub-lens group G3-*a* is below the minimum of the range defined in Condition 2, it becomes difficult to lower the height at which light enters into the camera body, and thus the height at which light enters into the camera body increases and the camera may become relatively large. If the refractive power of the 3a sub-lens group G3-*a* is above the maximum of the range defined in Condition 2, excessive negative spherical aberrations or comma aberrations occur, and thus it is difficult to correct aberrations of the lens system.

Furthermore, as a positive lens group is arranged on a side of the iris ST facing the image side, the position of the 3b sub-lens group G3-*b*, which is related to correction of aberrations and has a relatively high negative refractive power, is also set, and thus the height at which light enters into the camera body may be lowered and an F number of about 1.4 may be obtained.

Furthermore, the telephoto lens systems according to embodiments of the invention may satisfy Condition 3 below.

$$-3.00 < f/f3b\_n < -0.25 \quad \text{[Condition 3]}$$

Here, f indicates the overall focal length of the telephoto lens system, and f3b_n indicates the focal length of the negative lens in the 3b sub-lens group G3-*b* of the third lens group G3.

Condition 3 defines the refractive power of the negative lens of the 3b sub-lens group G3-*b* of the third lens group G3. Unlike a general double gauss type, in the present embodiment, a significantly concave surface arranged just next to the iris ST is omitted and a positive refractive power is arranged thereat. Therefore, it is necessary to arrange a negative lens, which generates positive spherical aberrations, to correct negative spherical aberrations and comma aberrations due to a relatively large diameter of a lens system. Condition 3 defines the refractive power of such a negative lens. Furthermore, the refractive power of the negative lens of the 3b sub-lens group G3-*b* as defined in Condition 3 and the refractive power of the 3a sub-lens group G3-*a* defined in Condition 2 control the height at which light enters into the camera body.

If the negative refractive power of the negative lens of the 3b sub-lens group G3-*b* is below the minimum of the range defined in Condition 3, excessive positive spherical aberrations occur, and thus spherical aberrations of the lens system are over-corrected. In an optical arrangement in the present embodiment, the positive refractive power of the 3a sub-lens group G3-*a* collects incident light and lowers the height of the incident light, and then the negative lens of the 3b sub-lens group G3-*b* refracts the incident light outward and onto the image surface IMG. As described above, an exit pupil is arranged relatively close to the image side. However, if the negative refractive power of the negative lens of the 3b sub-lens group G3-*b* is smaller than the minimum of the range defined in Condition 3, the exit pupil is located too close to the image side, and thus it is difficult to maintain a suitable back focal length as shown in Condition 1.

If the refractive power of the negative lens of the 3b sub-lens group G3-*b* is greater than the maximum of the range defined in Condition 3, positive spherical aberrations decrease, and thus spherical aberrations of the lens system may not be suitably corrected. Furthermore, it is difficult to arrange an exit pupil of the lens system close to the image side, and thus the height at which light enters into the camera body increases and the camera may become relatively large.

Furthermore, the telephoto lens systems according to embodiments of the invention may satisfy Condition 4 below.

$$-3.00 < \phi 3b\_n \times f < -0.30 \quad \text{[Condition 4]}$$

Here, f indicates the focal length of the overall telephoto lens system and φ3b_n indicates the refractive power of the surface of the negative lens of the 3b sub-lens group G3-*b* of the third lens group G3 having a relatively high negative refractive power.

The φ3b_n is defined as shown in Condition 5 below.

$$\phi 3b\_n = -|(n3b\_n - 1)/r3b| \quad \text{[Condition 5]}$$

Here, n3b_n indicates the refractive index of the negative lens of the 3b sub-lens group G3-*b*, and r3b indicates the radius of curvature of the surface of the negative lens of the 3b sub-lens group G3-*b* of the third lens group G3 having the relatively high negative refractive power.

Condition 4 is set to finely control spherical aberrations by using the 3b sub-lens group G3-*b*, defining the negative refractive power of the surface of the negative lens of the 3b sub-lens group G3-*b* having the relatively high negative refractive power. The present embodiment does not employ a significantly concave surface arranged just next to the iris ST such as in a double gauss type. Instead, the present embodiment sets a suitable refractive power for the surface of the negative lens of the 3b sub-lens group G3-*b* having the relatively high negative refractive power.

If the negative refractive power of the surface of the negative lens of the 3b sub-lens group G3-*b* having the relatively high negative refractive power is below the minimum of the range defined in Condition 4, excessive positive spherical aberrations occur, and thus spherical aberrations of the lens system are over-corrected. If the negative refractive power of the surface of the negative lens of the 3b sub-lens group G3-*b* having the relatively high negative refractive power is above the maximum of the range defined in Condition 4, positive spherical aberrations significantly decrease, and thus spherical aberrations of the lens system are insufficiently corrected.

Furthermore, in the telephoto lens systems according to embodiments of the invention, the 3a sub-lens group G3*a* may move in a direction crossing the optical axis, e.g., a direction almost perpendicular to the optical axis, to correct hand shakes. The 3a sub-lens group G3-*a* may include a negative lens and a positive lens sequentially arranged from the object side, where an additional negative lens may be arranged on a side of the 3a sub-lens group G3-*a* facing the image side as a lens relatively close to the image side. Generally, aberrations due to a viewing angle or a relatively large diameter may be ignored to a certain extent in telephoto lenses with relatively narrow viewing angles or zoom lenses with relatively large F numbers, and thus an anti-shaking lens group for correcting hand shakes may be simply configured using one or two lenses. However, since the present embodiment provides a relatively bright telephoto lens system with a relatively small F number, for example, about 1.4, it is necessary to correct aberrations of an anti-shaking lens group. As it is known that degrees of freedom of design with three or more lenses are required to correct all five Seidel aberrations, the 3a sub-lens group G3-*a*, which is an anti-shaking lens group, may include a negative lens, a positive lens, and a negative lens sequentially arranged from the object side. In this case, the 3a sub-lens group G3-*a* may satisfy Condition 2 and more efficiently correct aberrations.

Furthermore, the overall length of a conventional telephoto lens system is set based on a predetermined focal length, and furthermore, when such a lens system is designed for an SLR type camera, in which there is a reflective mirror for guiding light to an optical viewfinder, a sufficiently long back focal length is secured. Therefore, in a relatively bright optics having a focal length equivalent to those of the telephoto lens system according to embodiments of the invention and having an F number around 1.4, it is difficult to arrange driving sources, and thus it is difficult to configure an anti-shaking lens group for correcting hand shakes. However, according to the present embodiment, an anti-shaking lens group may be configured by setting a back focal length as defined in Condition 1.

Hereinafter, detailed lens configurations and lens data of each lens group according to each embodiment of the invention will be described. In the lens data below, STOP or ST indicates an iris, EFL indicates an overall focal length, and Fno indicates an F number. R, D, Nd, and Vd indicate a radius of curvature, a thickness of a lens or a distance between lenses, a refractive index, and an Abbe number, respectively. D1 and D2 indicate variable distances that vary according to focusing, and variable positions Pos1, Pos2, and Pos3 indicate object positions of infinity, 1/50 magnification, and the closest, respectively.

<First Embodiment>

FIG. 1 shows optical arrangements of a telephoto lens system according to a first embodiment of the invention at an infinite object position and at a closest object position. The telephoto lens system includes a first lens group G1 having a positive refractive power, a second lens group G2 having a negative refractive power, and a third lens group G3 having a positive refractive power. The first lens group G1 includes a first lens 111 as a positive lens, a second lens 121 as a positive lens, a third lens 131 as a negative lens, and a fourth lens 141 as a positive lens. The second lens group G2 includes a fifth lens 211 as a positive lens, and a sixth lens 221 as a negative lens. The fifth lens 211 and the sixth lens 221 are adhered to each other and form a doublet lens. The third lens group G3 includes the 3a sub-lens group G3-$a$ and the 3b sub-lens group G3-$b$. The 3a sub-lens group G3-$a$ includes a seventh lens 311 as a negative lens, and an eighth lens 321 as a positive lens, wherein the seventh lens 311 and the eighth lens 321 are adhered to each other and form a doublet lens. The 3b sub-lens group G3-$b$ includes a ninth lens 331 as a positive lens, and a tenth lens 341 as a negative lens.

Lens data is as shown below.

| EFL 85.01 FNO 1.44 | | | | |
|---|---|---|---|---|
| Surf | R | D | Nd | Vd |
| 1 | 60.561 | 10.986 | 1.61800 | 63.4 |
| 2 | −592.244 | 0.100 | | |
| 3 | 47.310 | 7.463 | 1.80420 | 46.5 |
| 4 | 122.837 | 2.314 | | |
| 5 | 991.103 | 4.142 | 1.69895 | 30.1 |
| 6 | 30.284 | 0.988 | | |
| 7 | 32.912 | 8.768 | 1.49700 | 81.6 |
| 8 | 238.182 | 3.925 | | |
| 9 | −402.507 | 4.086 | 1.84666 | 23.8 |
| 10 | −58.134 | 1.500 | 1.74400 | 44.9 |
| 11 | 32.003 | 14.065 | | |
| 12 | Infinity | 8.783 | | (STOP) |
| 13 | 93.377 | 1.500 | 1.69895 | 30.1 |
| 14 | 45.475 | 6.079 | 1.80420 | 46.5 |
| 15 | −64.139 | 6.131 | | |
| 16 | 32.411 | 3.061 | 1.77250 | 49.6 |
| 17 | 49.321 | 1.911 | | |
| 18 | −2041.322 | 1.300 | 1.72825 | 28.3 |
| 19 | 48.072 | 19.447 | | |
| 20 | Infinity | 2.800 | 1.51680 | 64.2 (Filter) |
| 21 | Infinity | 0.522 | | |

TABLE 1

| | Pos1 | Pos2 | Pos3 |
|---|---|---|---|
| RED. | 0.0000 | −0.0200 | −0.1306 |
| OBJ. DIST. | INF. | 4300.641 | 700.000 |
| D1 | 3.925 | 5.005 | 11.202 |
| D2 | 14.065 | 12.985 | 6.788 |

Figure 3:
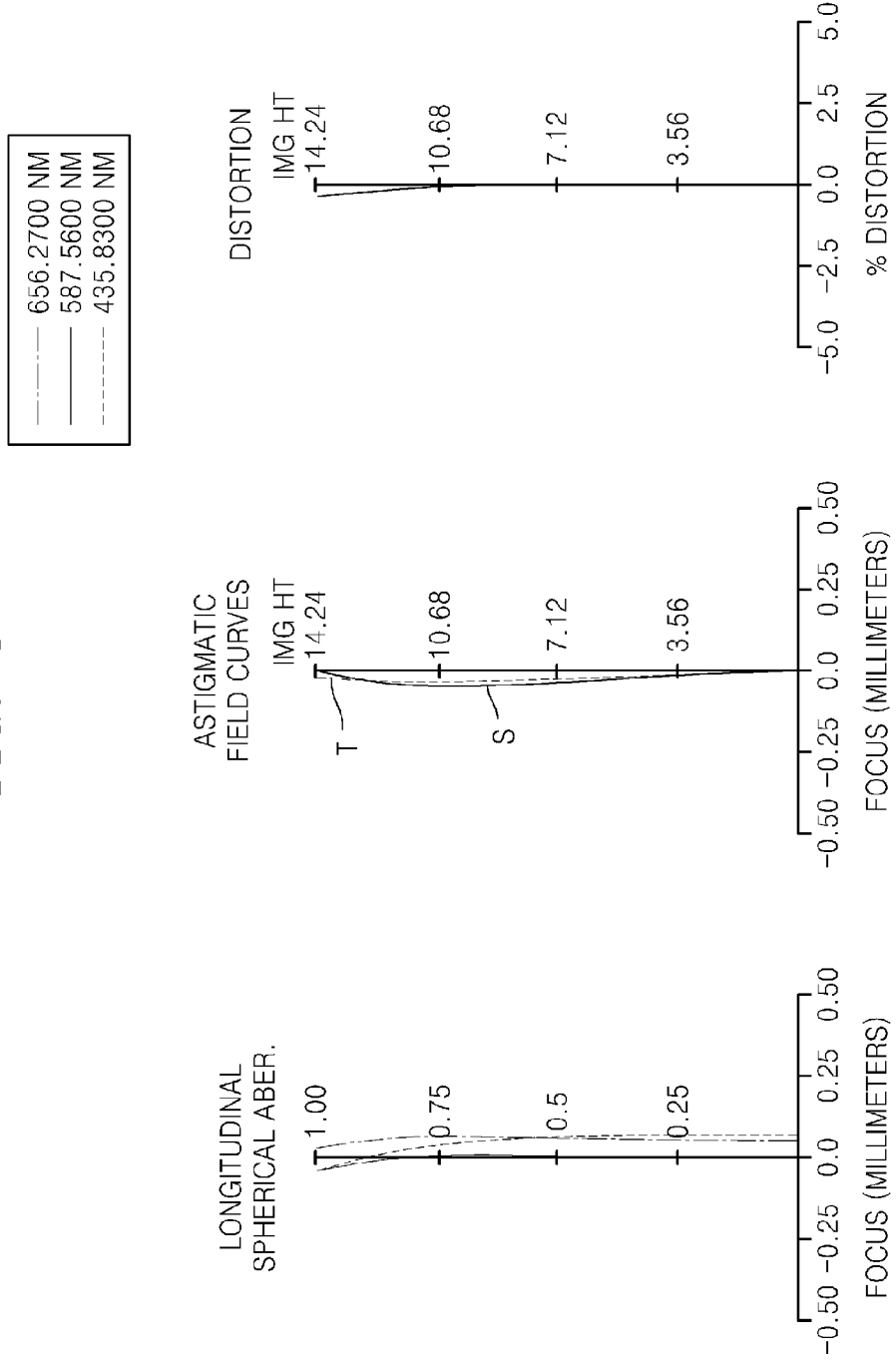
FIG. 3 is aberration diagrams showing longitudinal spherical aberration, astigmatic field curves and distortion in the telephoto lens system according to the first embodiment of the invention at an infinite object position.
Figure 4:
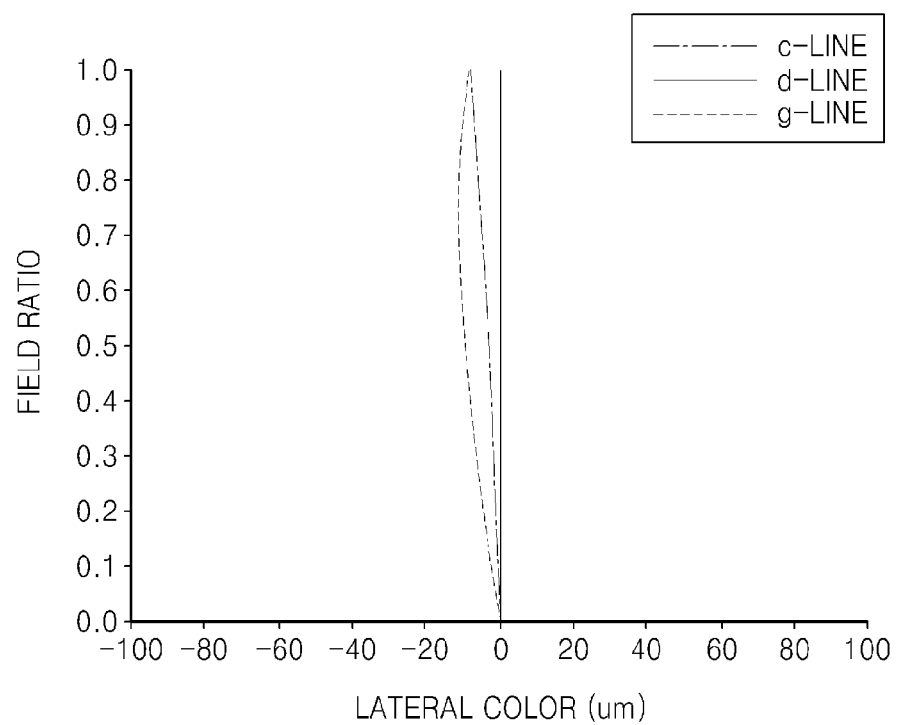
FIG. 4 is an aberration diagram showing lateral chromatic aberration in the telephoto lens system according to the first embodiment of the invention at an infinite object position.
Figure 5:
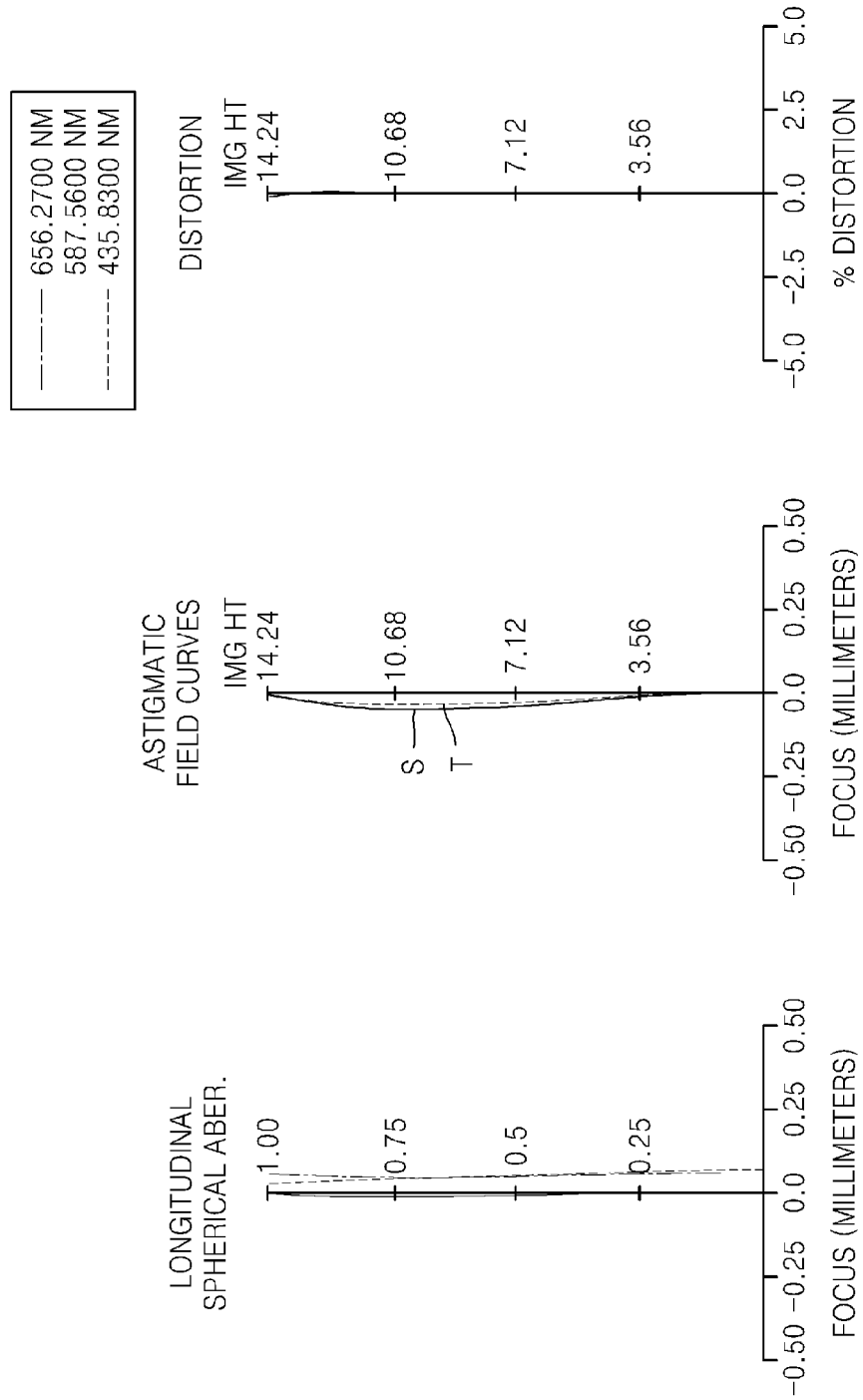
FIG. 5 is aberration diagrams showing longitudinal spherical aberration, astigmatic field curves and distortion in the telephoto lens system according to the first embodiment of the invention when an object position is 1/50 magnification position.
Figure 6:
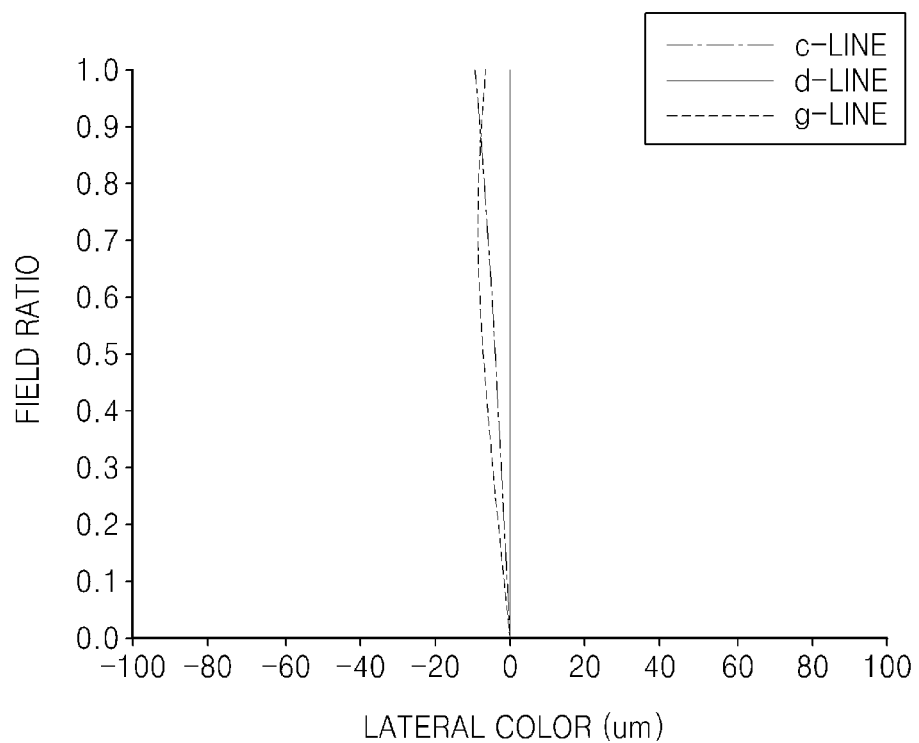
FIG. 6 is an aberration diagram showing lateral chromatic aberration in the telephoto lens system according to the first embodiment of the invention when an object position is 1/50 magnification position.
Figure 7:
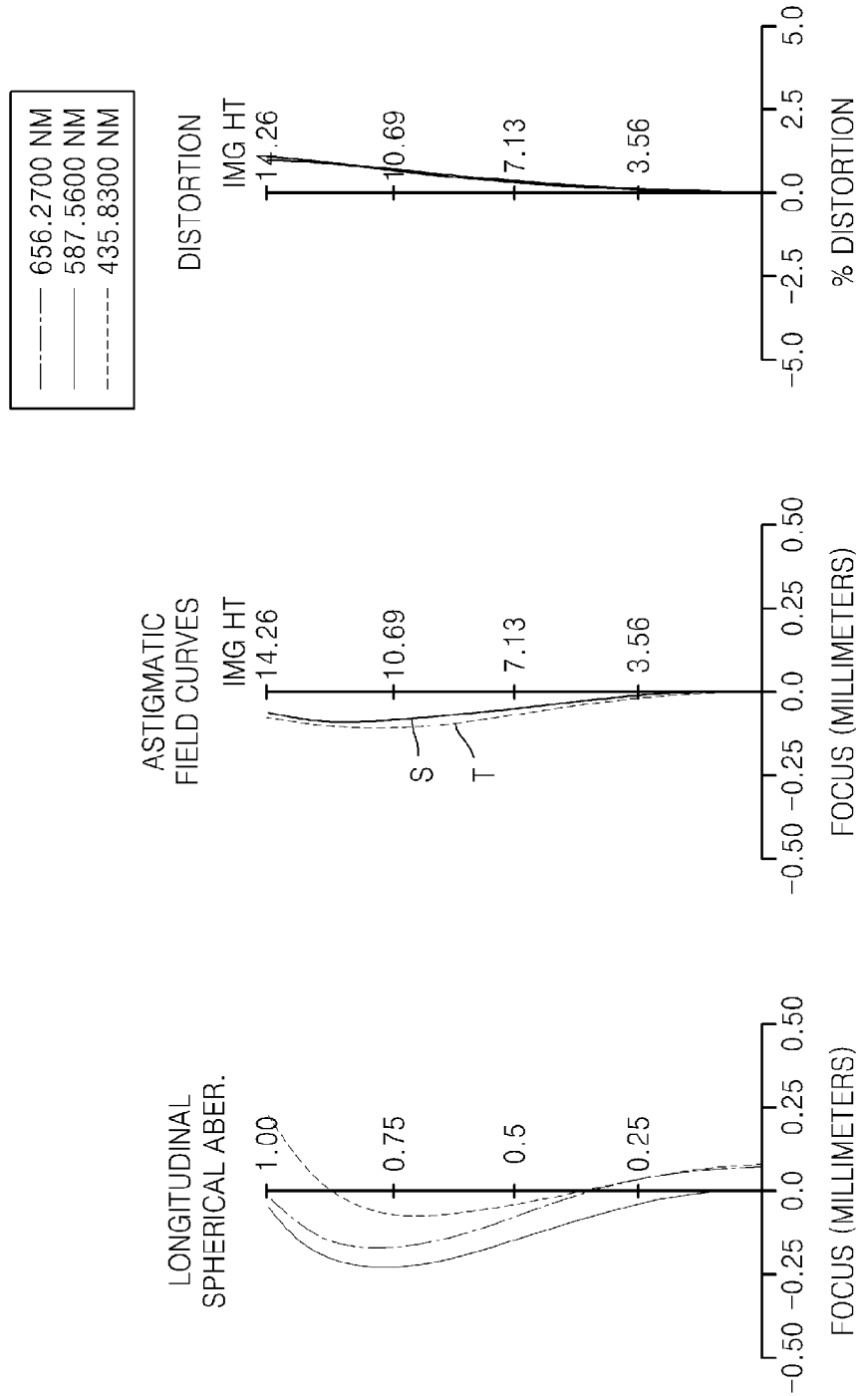
FIG. 7 is aberration diagrams showing longitudinal spherical aberration, astigmatic field curves and distortion in the telephoto lens system according to the first embodiment of the invention when an object position is the closest position.
Figure 8:
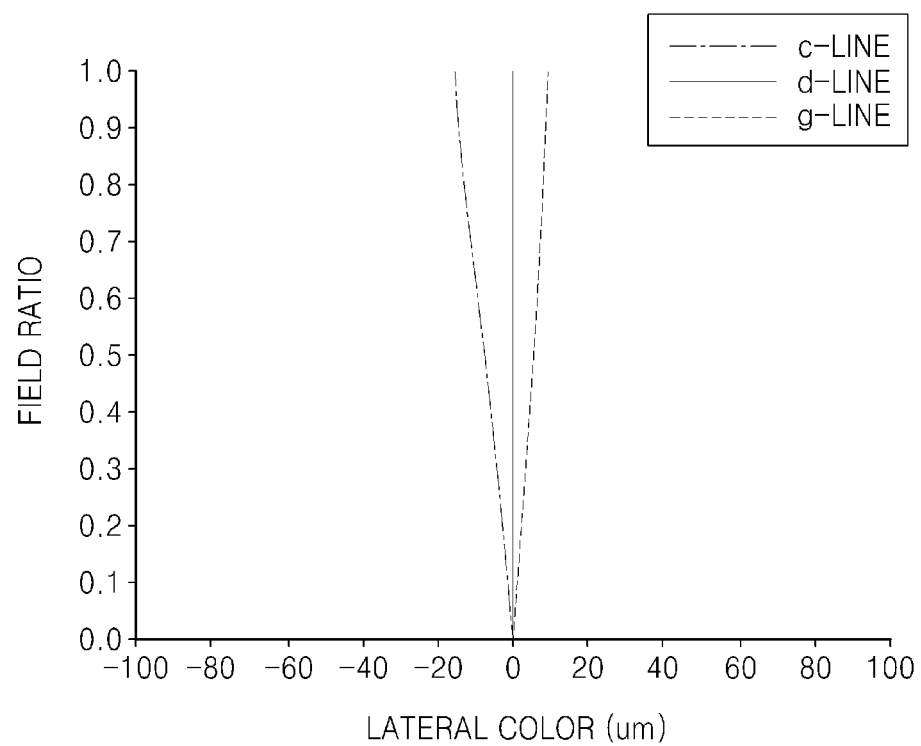
FIG. 8 is an aberration diagram showing lateral chromatic aberration in the telephoto lens system according to the first embodiment of the invention when an object position is the closest position.

FIGS. 3, 5, and 7 are aberration diagrams showing longitudinal spherical aberrations and astigmatic field curves in a telephoto lens system according to the first embodiment of the invention when an object position is Pos1, Pos2, and Pos3, respectively. FIGS. 4, 6, and 8 are aberration diagrams showing lateral chromatic aberrations in a telephoto lens system according to the first embodiment of the invention when an object position is Pos1, Pos2, and Pos3, respectively.

Spherical aberrations and lateral chromatic aberrations are shown with respect to a line C corresponding to a wavelength 656.27 nm, a line d corresponding to a wavelength 587.56 nm, and a line g corresponding to a wavelength 435.83 nm. With respect to astigmatic field curves, T and S indicate curvatures on a tangential surface and a sagittal surface, respectively.

<Second Embodiment>

Figure 9:
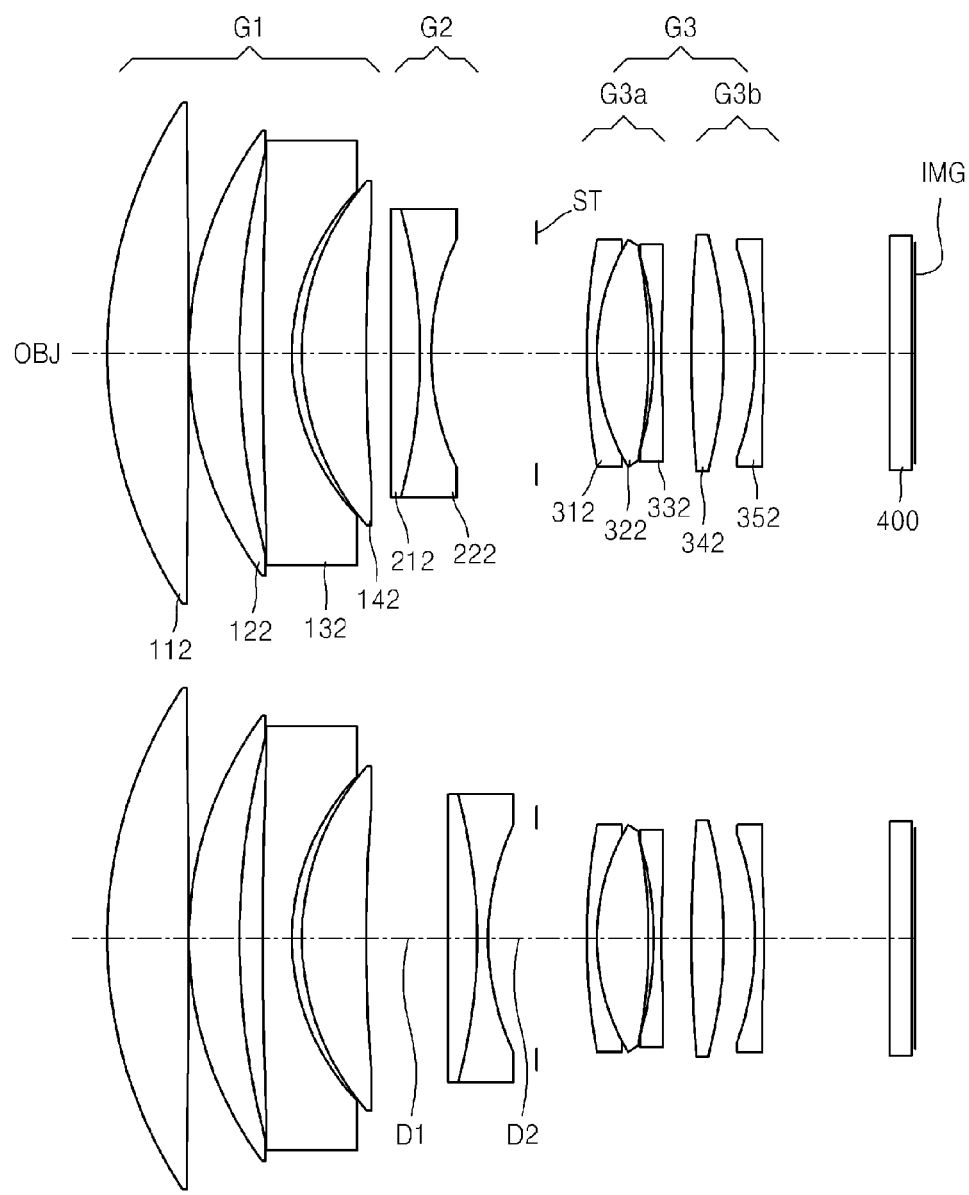
FIG. 9 shows optical arrangements of the telephoto lens system according to a second embodiment of the invention at an infinite object position and at a closest object position.

FIG. 9 shows optical arrangements of a telephoto lens system according to a second embodiment of the invention. The telephoto lens system includes the first lens group G1 having a positive refractive power, the second lens group G2 having a negative refractive power, and a third lens group G3 having a positive refractive power. The first lens group G1 includes a first lens 112 as a positive lens, a second lens 122 as a positive lens, a third lens 132 as a negative lens, and a fourth lens 142 as a positive lens. The second lens group G2 includes a fifth lens 212 as a positive lens, and a sixth lens 222 as a negative lens. The fifth lens 212 and the sixth lens 222 are adhered to each other and form a doublet lens. The third lens group G3 includes the 3a sub-lens group G3-$a$ and the 3b sub-lens group G3-$b$. The 3a sub-lens group G3-$a$ includes a seventh lens 312 as a negative lens, an eighth lens 322 as a positive lens, and a ninth lens 332 as a negative lens, wherein the seventh lens 311 and the eighth lens 321 are adhered to each other and form a doublet lens. The 3b sub-lens group G3-$b$ includes a tenth lens 332 as a positive lens, and an eleventh lens 342 as a negative lens.

Lens data is as shown below.

| EFL 84.91 | FNO 1.44 | | | |
|---|---|---|---|---|
| Surf | R | D | Nd | Vd |
| 1 | 57.047 | 11.039 | 1.61800 | 63.4 |
| 2 | −1761.280 | 0.100 | | |
| 3 | 46.636 | 7.127 | 1.80420 | 46.5 |
| 4 | 104.034 | 3.042 | | |
| 5 | 525.858 | 4.210 | 1.69895 | 30.1 |
| 6 | 28.829 | 1.296 | | |
| 7 | 32.277 | 8.907 | 1.49700 | 81.6 |
| 8 | 332.868 | 3.435 | | |
| 9 | −1251.008 | 3.978 | 1.84666 | 23.8 |
| 10 | −65.462 | 1.500 | 1.74400 | 44.9 |
| 11 | 32.268 | 14.584 | | |
| 12 | Infinity | 6.913 | | (STOP) |
| 13 | 78.628 | 1.500 | 1.62004 | 36.3 |
| 14 | 28.442 | 7.177 | 1.83481 | 42.7 |
| 15 | −56.304 | 0.457 | | |
| 16 | −45.501 | 1.000 | 1.62588 | 35.7 |
| 17 | 197.169 | 4.322 | | |
| 18 | 182.553 | 4.500 | 1.83400 | 37.3 |
| 19 | −48.829 | 4.170 | | |
| 20 | −39.125 | 1.300 | 1.84666 | 23.8 |
| 21 | −233.572 | 17.656 | | |
| 22 | Infinity | 2.800 | 1.51680 | 64.2 (Filter) |
| 23 | Infinity | 0.521 | | |

TABLE 2

|  | Pos1 | Pos2 | Pos3 |
|---|---|---|---|
| RED. | 0.0000 | −0.0200 | −0.1303 |
| OBJ. DIST. | INF. | 4294.782 | 700.000 |
| D1 | 3.435 | 4.608 | 11.366 |
| D2 | 14.584 | 13.411 | 6.653 |

Figure 10:
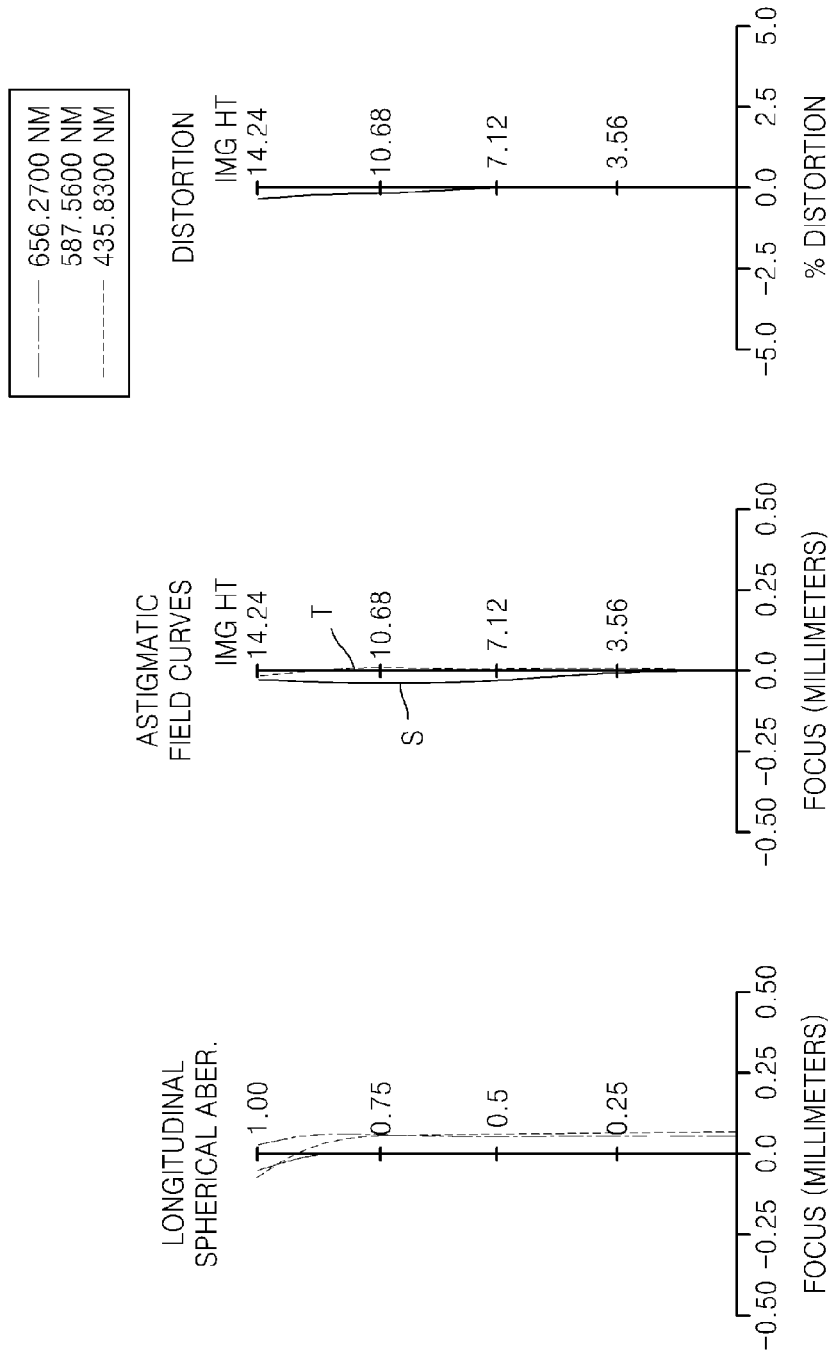
FIG. 10 is aberration diagrams showing longitudinal spherical aberration, astigmatic field curves and distortion in the telephoto lens system according to the second embodiment of the invention when an object position is infinite position.
Figure 11:
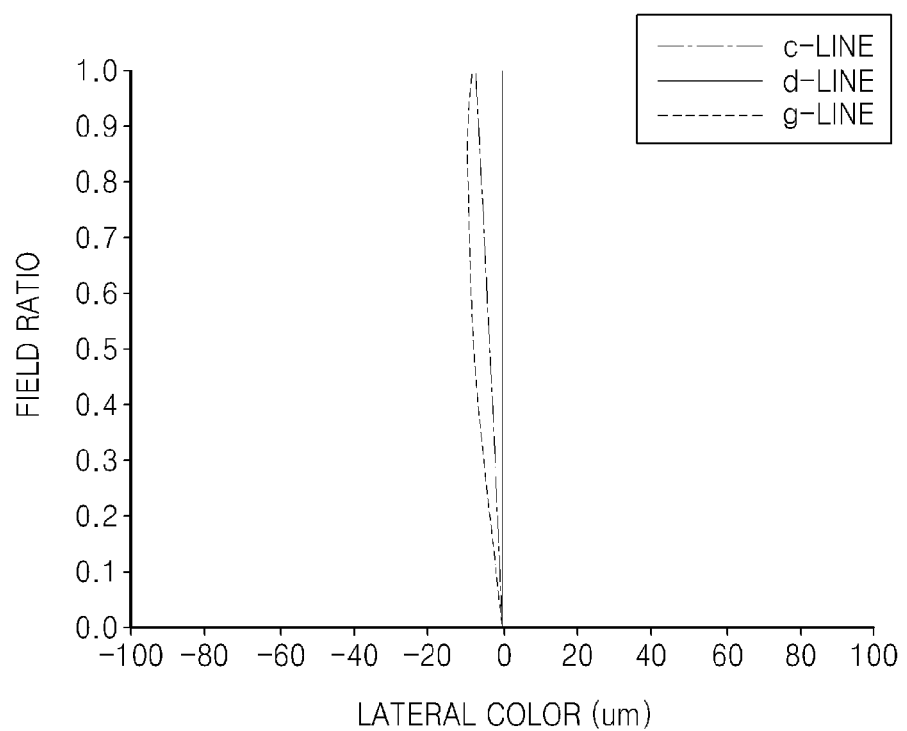
FIG. 11 is an aberration diagram showing lateral chromatic aberration in the telephoto lens system according to the second embodiment of the invention at an infinite object position.
Figure 12:
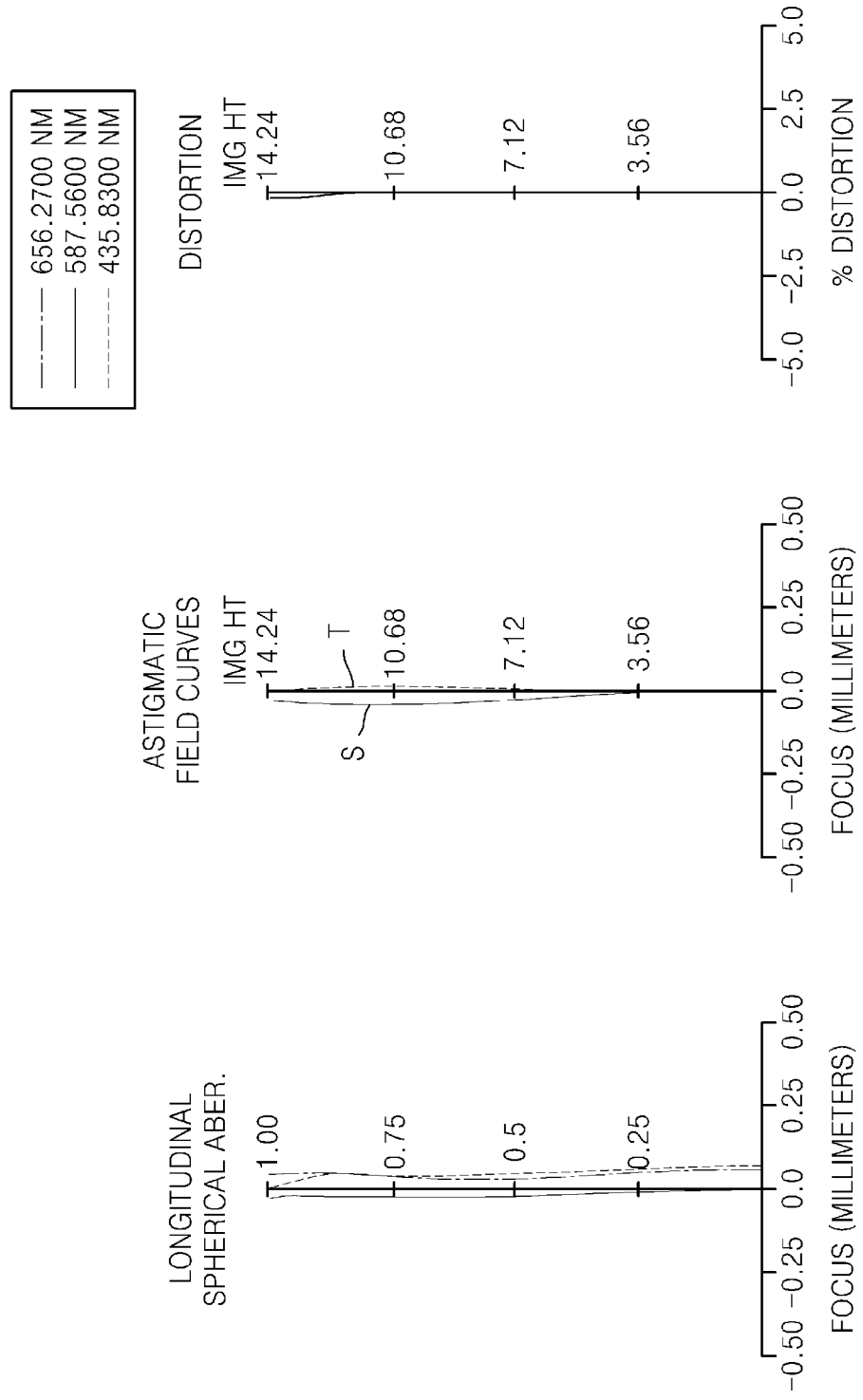
FIG. 12 is an aberration diagrams showing longitudinal spherical aberration, astigmatic field curves and distortion in the telephoto lens system according to the second embodiment of the invention when an object position is 1/50 magnification position.
Figure 13:
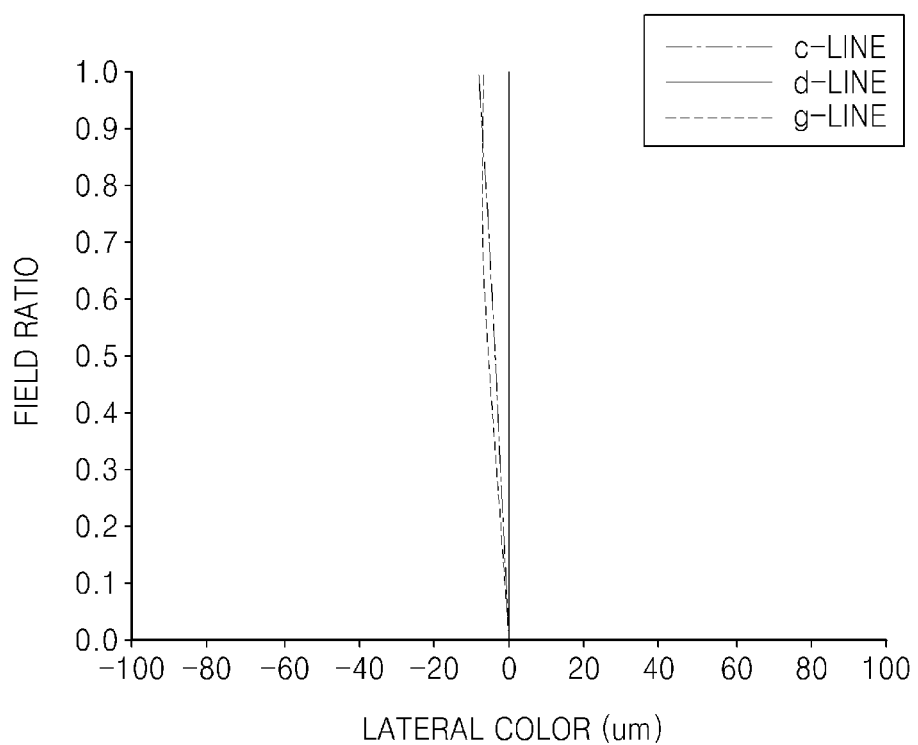
FIG. 13 is an aberration diagram showing lateral chromatic aberration in the telephoto lens system according to the second embodiment of the invention when an object position is 1/50 magnification position.
Figure 14:
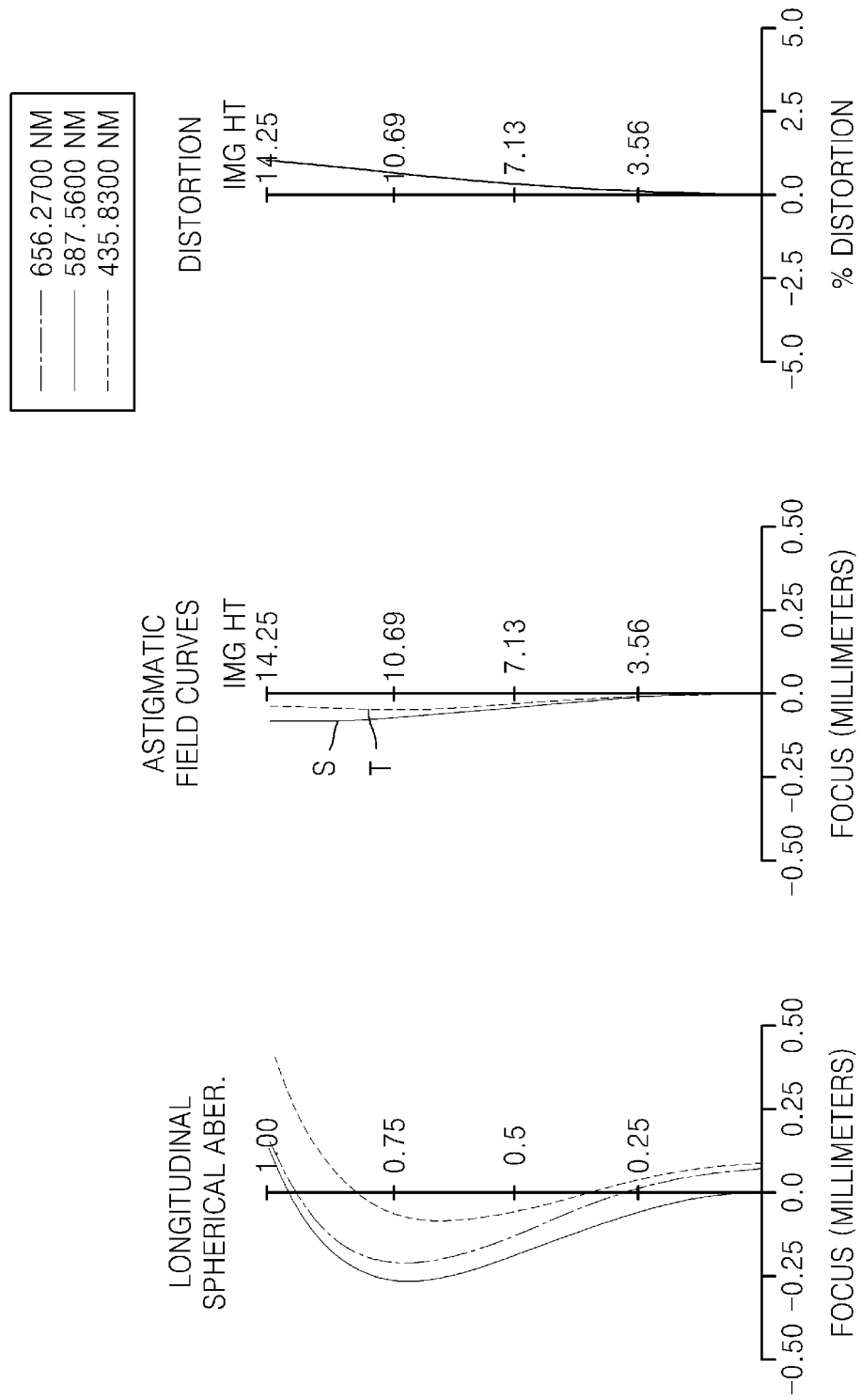
FIG. 14 is aberration diagrams showing longitudinal spherical aberration, astigmatic field curves and distortion in the telephoto lens system according to the second embodiment of the invention when an object position is at the closest position.
Figure 15:
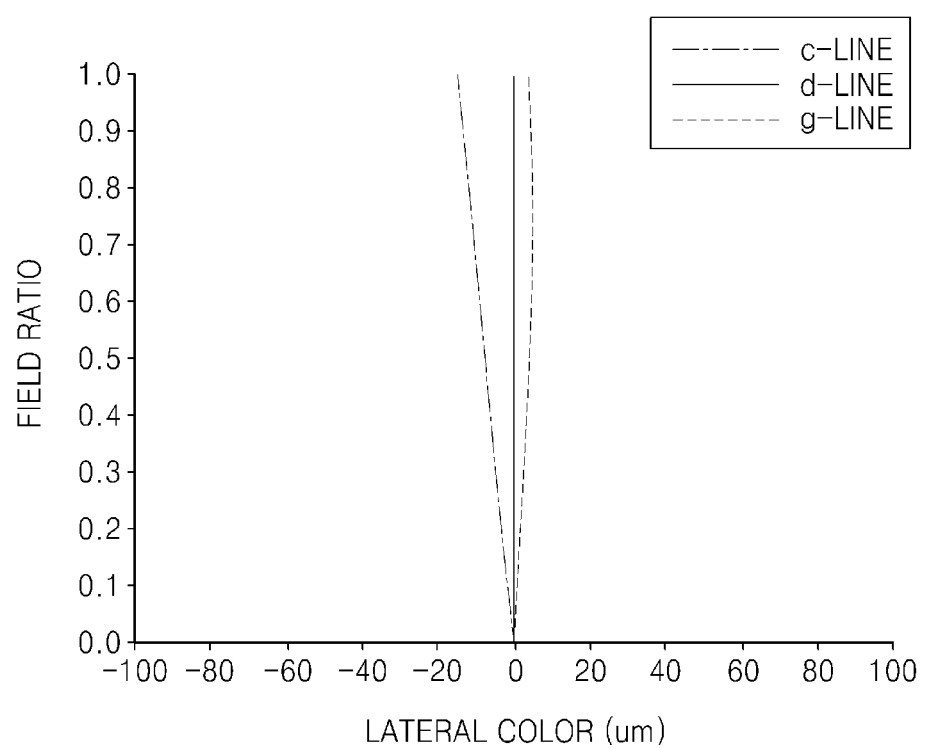
FIG. 15 is an aberration diagram showing lateral chromatic aberration in the telephoto lens system according to the second embodiment of the invention when an object position is at the closest position.

FIGS. 10, 12, and 14 are aberration diagrams showing longitudinal spherical aberrations and astigmatic field curves in a telephoto lens system according to the second embodiment of the invention when an object position is Pos1, Pos2, and Pos3, respectively. FIGS. 11, 13, and 15 are aberration diagrams showing lateral chromatic aberrations in a telephoto lens system according to the second embodiment of the invention when an object position is Pos1, Pos2, and Pos3, respectively.

<Third Embodiment>

Figure 16:
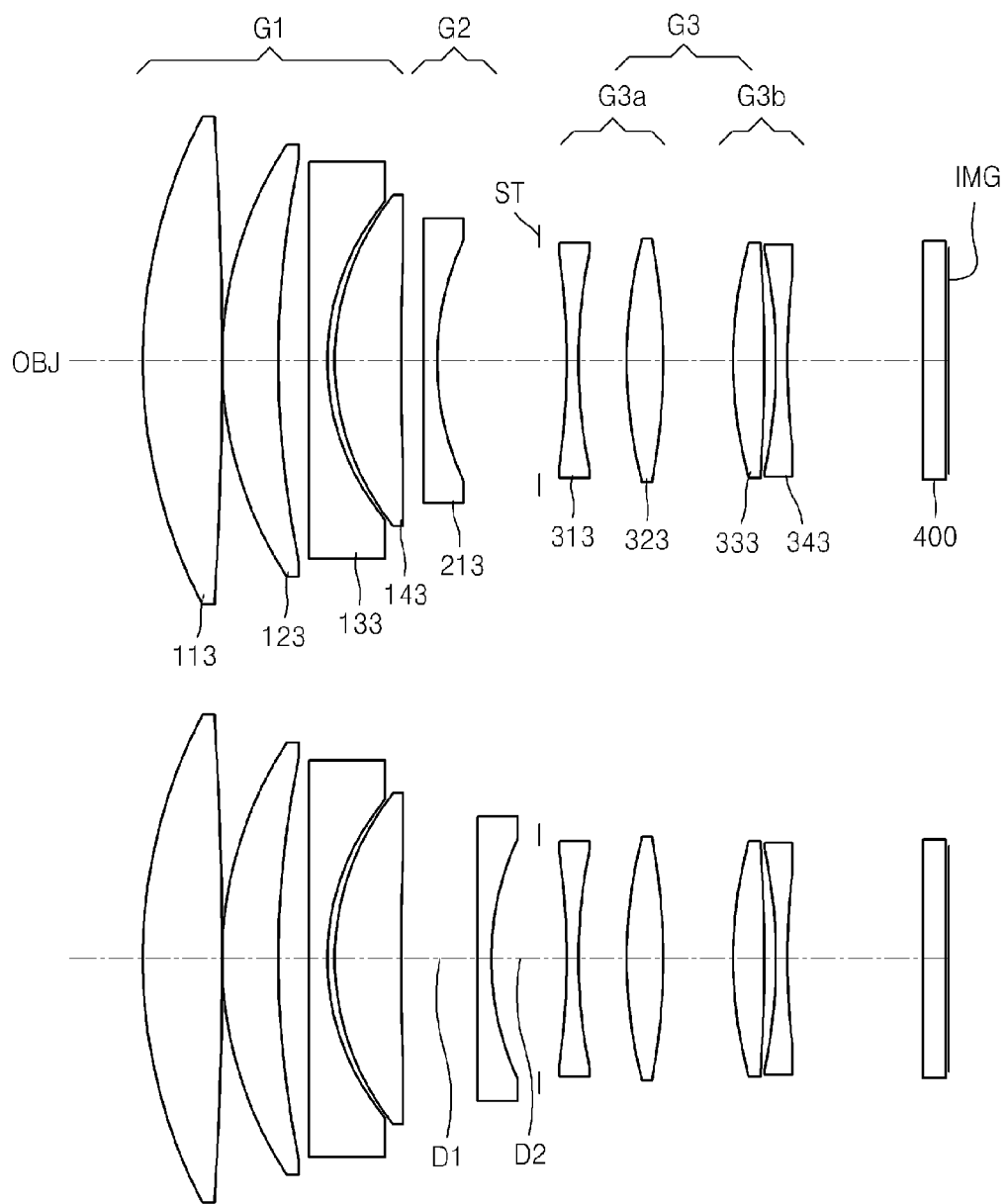
FIG. 16 shows optical arrangements of a telephoto lens system according to a third embodiment of the invention at an infinite position and at a closest position.

FIG. 16 shows optical arrangements of a telephoto lens system according to a third embodiment of the invention. The telephoto lens system includes the first lens group G1 having a positive refractive power, the second lens group G2 having a negative refractive power, and a third lens group G3 having a positive refractive power. The first lens group G1 includes a first lens 113 as a positive lens, a second lens 123 as a positive lens, a third lens 133 as a negative lens, and a fourth lens 143 as a positive lens. The second lens group G2 includes a fifth lens 223 as a negative lens. The third lens group G3 includes the 3a sub-lens group G3-*a* and the 3b sub-lens group G3-*b*. The 3a sub-lens group G3-*a* includes a sixth lens 313 as a negative lens, and a seventh lens 323 as a positive lens. The 3b sub-lens group G3-*b* includes an eighth lens 333 as a positive lens, and a ninth lens 343 as a negative lens. Lens data is as shown below.

EFL 85.01
FNO 1.44

| Surf | R | D | Nd | Vd |
|---|---|---|---|---|
| 1 | 62.349 | 10.724 | 1.61800 | 63.4 |
| 2 | −608.043 | 0.100 | | |
| 3 | 46.634 | 7.814 | 1.80420 | 46.5 |
| 4 | 131.372 | 3.844 | | |
| 5 | 1333.947 | 2.500 | 1.69895 | 30.1 |
| 6 | 29.228 | 1.033 | | |
| 7 | 31.934 | 8.971 | 1.49700 | 81.6 |
| 8 | 379.949 | 3.293 | | |
| 9 | −2627.945 | 1.500 | 1.69680 | 55.5 |
| 10 | 35.241 | 13.842 | | |
| 11 | Infinity | 3.914 | | (STOP) |
| 12 | −106.240 | 1.500 | 1.54814 | 45.8 |
| 13 | 65.301 | 6.444 | | |
| 14 | 53.682 | 5.186 | 1.83400 | 37.3 |
| 15 | −69.758 | 9.302 | | |
| 16 | 52.744 | 4.500 | 1.80420 | 46.5 |
| 17 | −145.715 | 1.587 | | |
| 18 | −57.992 | 1.300 | 1.84666 | 23.8 |
| 19 | 100.508 | 18.613 | | |
| 20 | Infinity | 2.800 | 1.51680 | 64.2 (Filter) |
| 21 | Infinity | 0.517 | | |

TABLE 3

|  | Pos1 | Pos2 | Pos3 |
|---|---|---|---|
| RED. | 0.0000 | −0.0200 | −0.1284 |
| OBJ. DIST. | INF. | 4289.669 | 700.000 |
| D1 | 3.293 | 4.374 | 10.557 |
| D2 | 13.841 | 12.760 | 6.577 |

Figure 17:
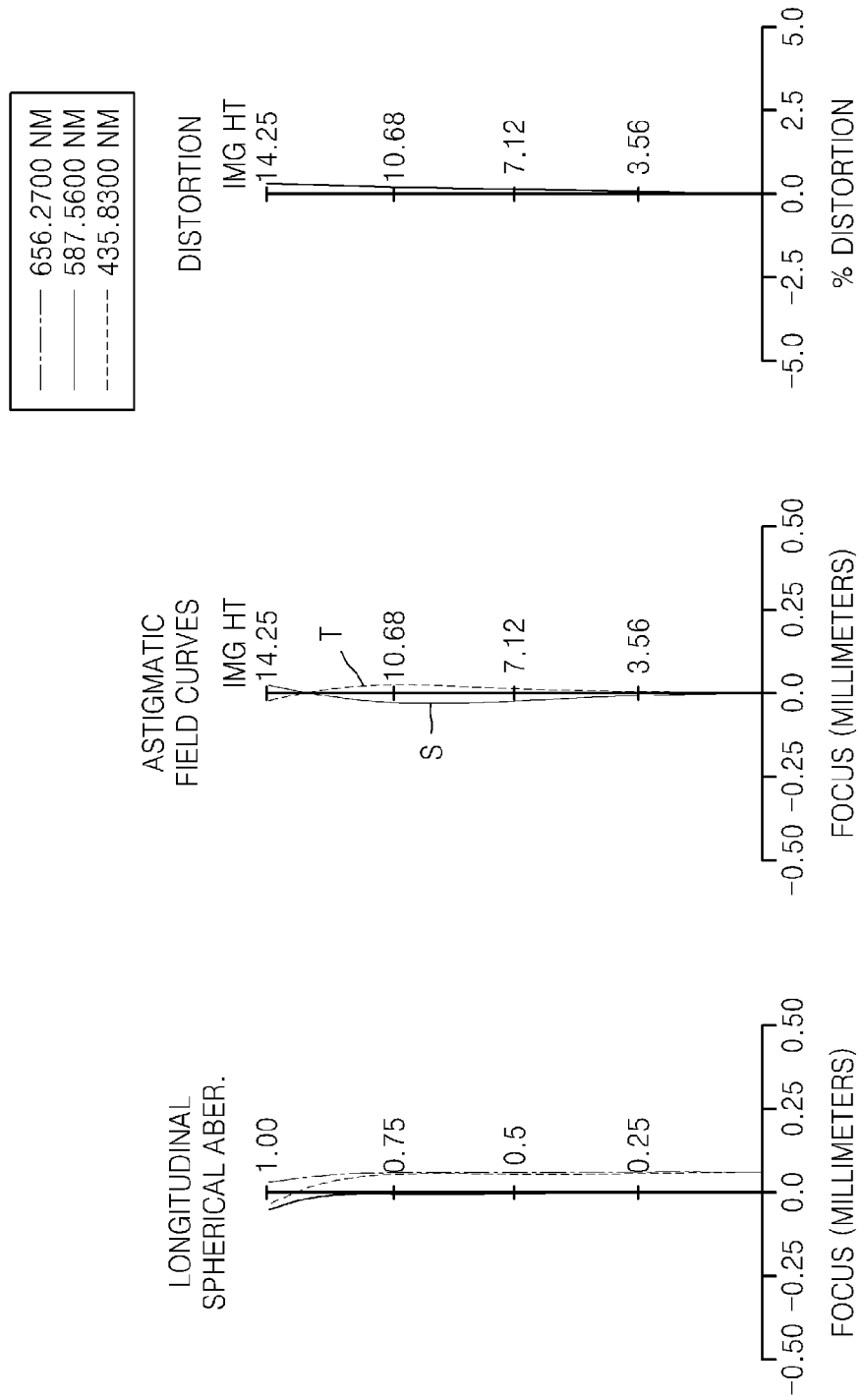
FIG. 17 is aberration diagrams showing longitudinal spherical aberration, astigmatic field curves and distortion in the telephoto lens system according to the third embodiment of the invention at an infinite object position.
Figure 18:
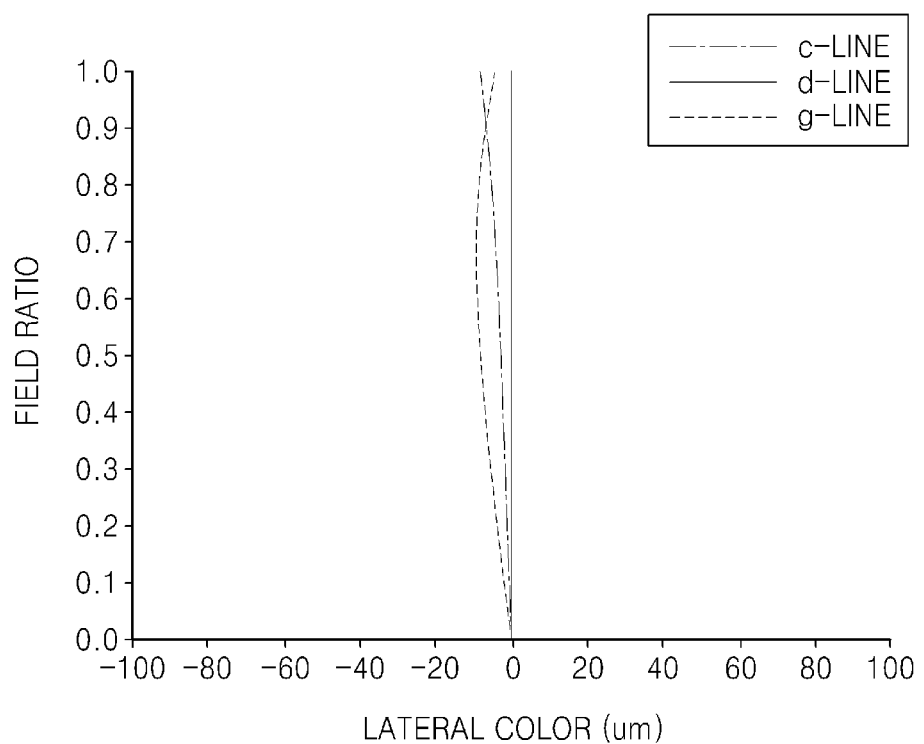
FIG. 18 is an aberration diagram showing lateral chromatic aberration in the telephoto lens system according to the third embodiment of the invention at an infinite object position.
Figure 19:
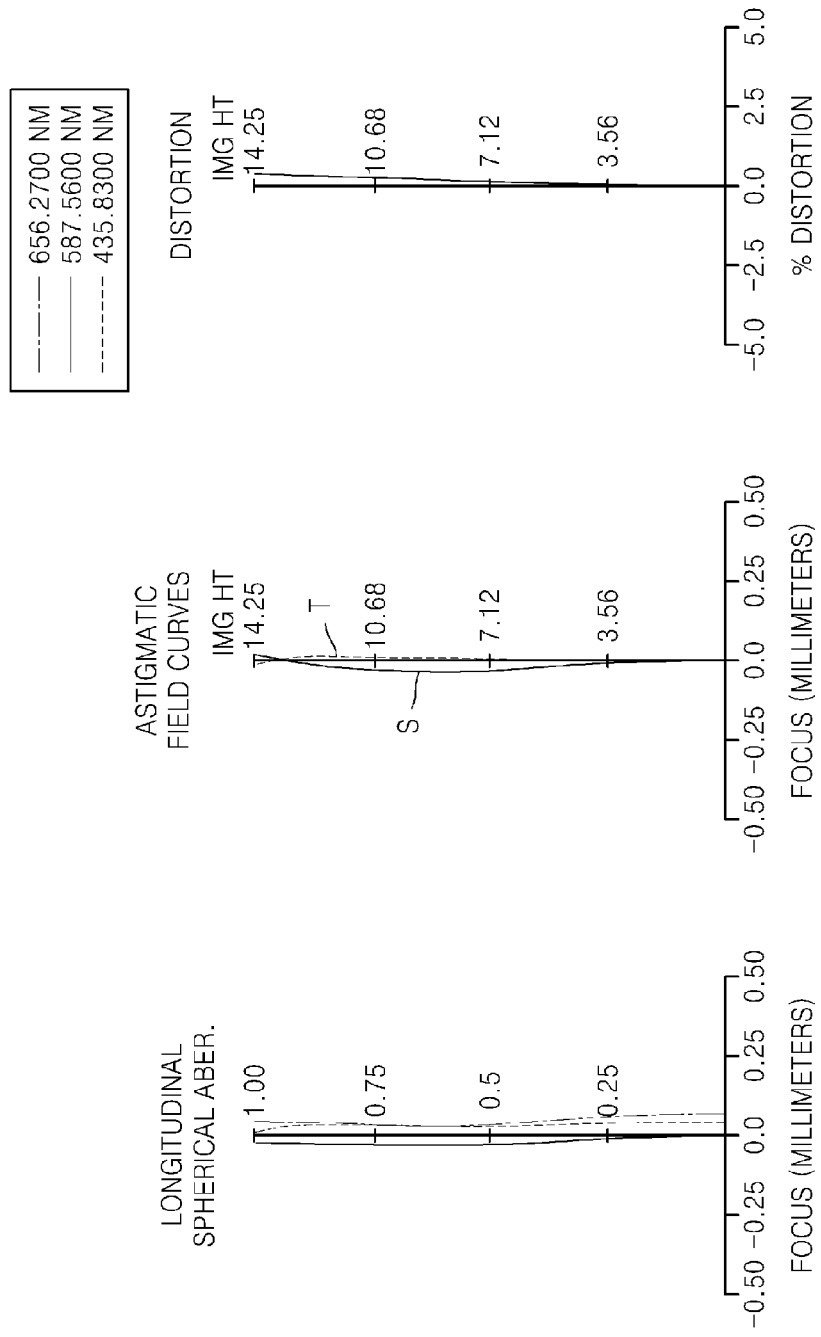
FIG. 19 is aberration diagrams showing longitudinal spherical aberration, astigmatic field curves and distortion in the telephoto lens system according to the third embodiment of the invention when an object position is 1/50 magnification position.
Figure 20:
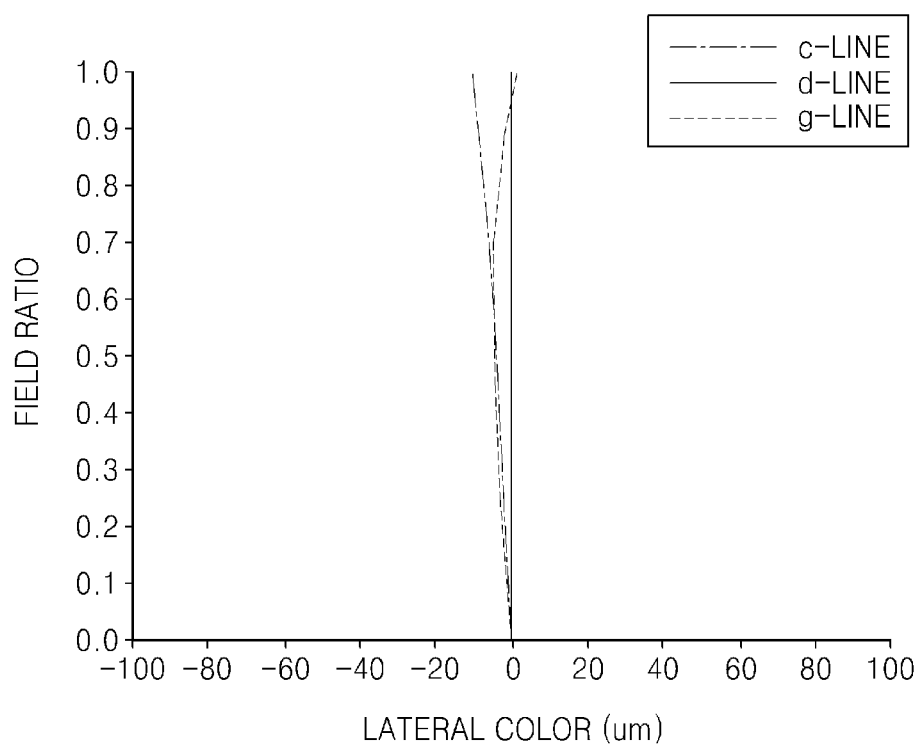
FIG. 20 is an aberration diagram showing lateral chromatic aberration in the telephoto lens system according to the third embodiment of the invention when an object position is 1/50 magnification position.
Figure 21:
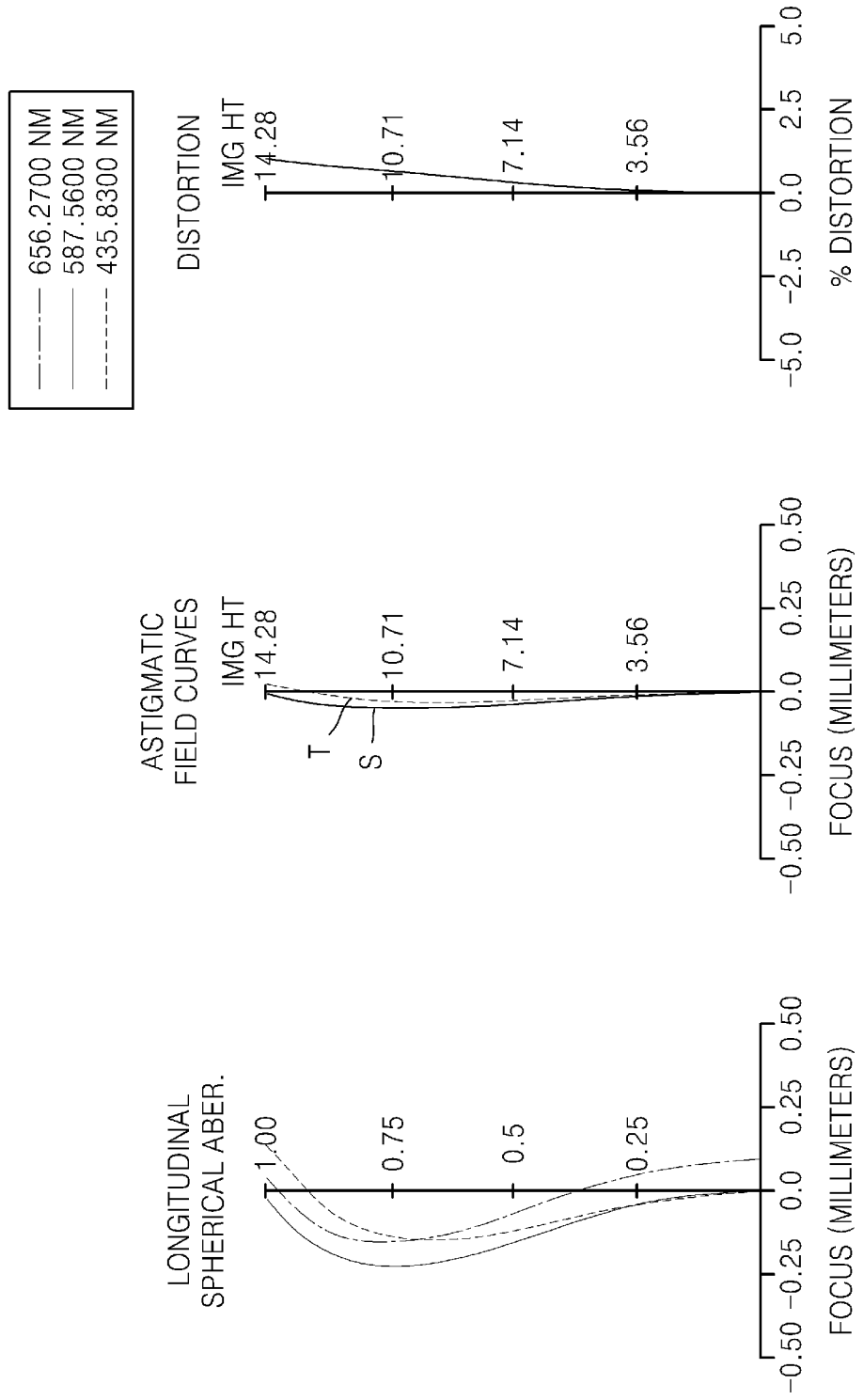
FIG. 21 is aberration diagrams showing longitudinal spherical aberration, astigmatic field curves and distortion in the telephoto lens system according to the third embodiment of the invention when an object position is at the closest position.
Figure 22:
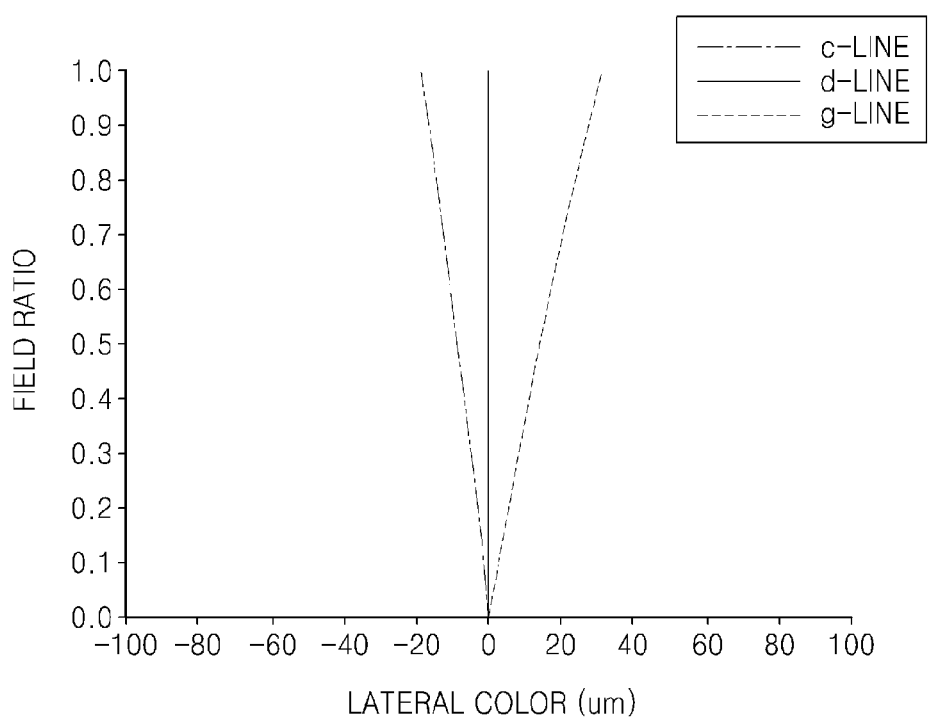
FIG. 22 is an aberration diagram showing lateral chromatic aberration in the telephoto lens system according to the third embodiment of the invention when an object position is at the closest position.

FIGS. 17, 19, and 21 are aberration diagrams showing longitudinal spherical aberrations and astigmatic field curves in a telephoto lens system according to the third embodiment of the invention when an object position is Pos1, Pos2, and Pos3, respectively. FIGS. 18, 20, and 22 are aberration diagrams showing lateral chromatic aberrations in a telephoto lens system according to the third embodiment of the invention when an object position is Pos1, Pos2, and Pos3, respectively.

<Fourth Embodiment>

Figure 23:
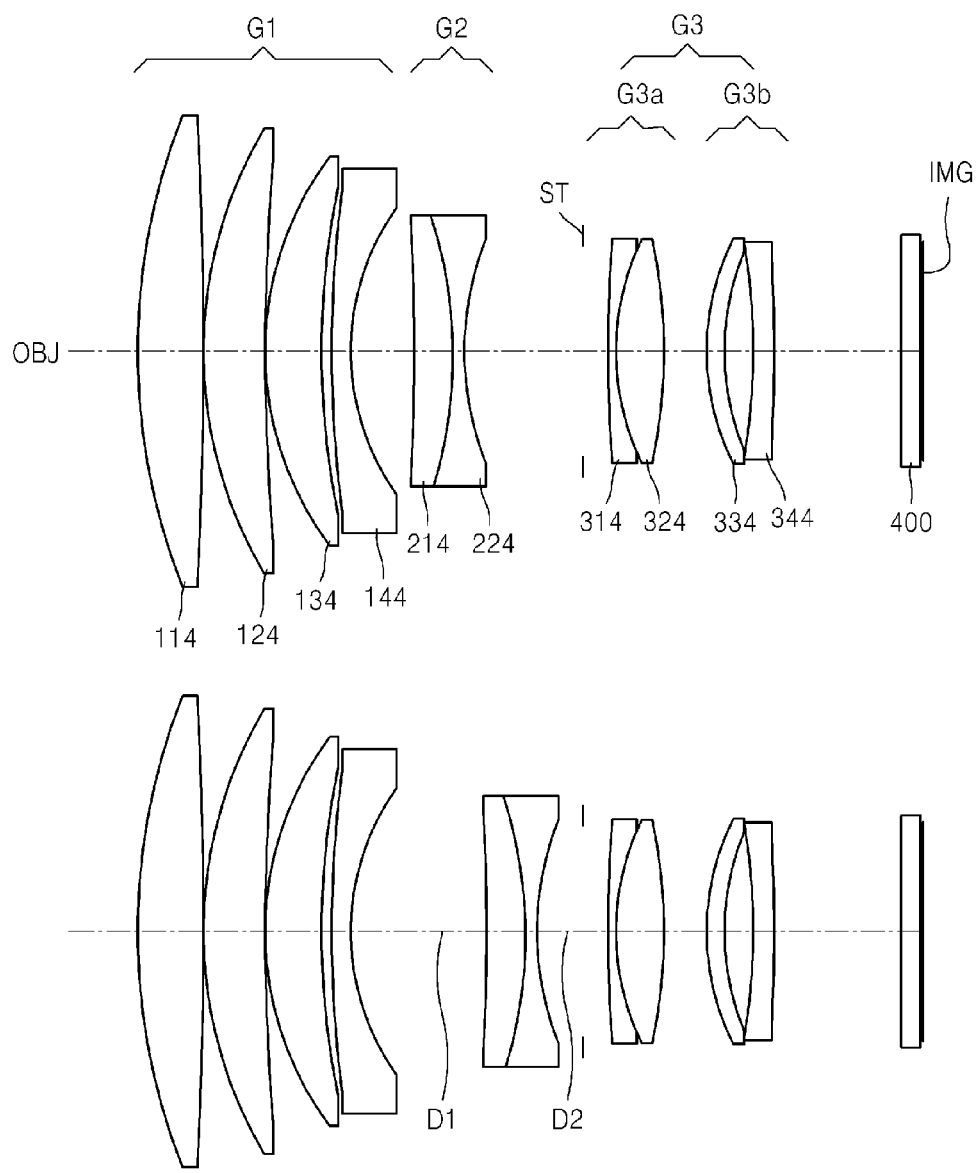
FIG. 23 shows optical arrangements of a telephoto lens system according to a fourth embodiment of the invention at an infinite position and at a closest position.

FIG. 23 shows optical arrangements of a telephoto lens system according to a fourth embodiment of the invention. The telephoto lens system includes the first lens group G1 having a positive refractive power, the second lens group G2 having a negative refractive power, and a third lens group G3 having a positive refractive power. The first lens group G1 includes a first lens 114 as a positive lens, a second lens 124 as a positive lens, a third lens 134 as a negative lens, and a fourth lens 144 as a positive lens. The second lens group G2 includes a fifth lens 214 as a positive lens, and a sixth lens 224 as a negative lens. The fifth lens 214 and the sixth lens 224 are adhered to each other and form a doublet lens. The third lens group G3 includes the 3a sub-lens group G3-*a* and the 3b sub-lens group G3-*b*. The 3a sub-lens group G3-*a* includes a seventh lens 314 as a negative lens, and an eighth lens 324 as a positive lens, where the seventh lens 314 and the eighth lens 324 are adhere to each other and form a doublet lens. The 3b sub-lens group G3-*b* includes a ninth lens 334 as a positive lens, and a tenth lens 344 as a negative lens. Lens data is as shown below.

EFL 84.92
FNO 1.44

| Surf | R | D | Nd | Vd |
|---|---|---|---|---|
| 1 | 79.301 | 8.985 | 1.49700 | 81.6 |
| 2 | −607.483 | 0.100 | | |
| 3 | 53.731 | 8.548 | 1.49700 | 81.6 |
| 4 | 276.272 | 0.100 | | |
| 5 | 40.339 | 8.033 | 1.80420 | 46.5 |
| 6 | 111.986 | 1.316 | | |
| 7 | 209.770 | 2.500 | 1.74077 | 27.8 |
| 8 | 30.625 | 8.913 | | |
| 9 | −370.138 | 5.489 | 1.84666 | 23.8 |
| 10 | −54.697 | 1.500 | 1.74400 | 44.9 |
| 11 | 37.017 | 16.408 | | |
| 12 | Infinity | 3.415 | | (STOP) |
| 13 | 170.703 | 1.500 | 1.69895 | 30.1 |
| 14 | 32.261 | 6.573 | 1.80420 | 46.5 |
| 15 | −66.396 | 5.648 | | |
| 16 | 29.005 | 2.721 | 1.77250 | 49.6 |
| 17 | 34.639 | 3.884 | | |
| 18 | −92.602 | 3.000 | 1.72825 | 28.3 |
| 19 | −291.589 | 17.656 | | |
| 20 | Infinity | 2.800 | 1.51680 | 64.2 (Filter) |
| 21 | Infinity | 0.522 | | |

TABLE 4

|  | Pos1 | Pos2 | Pos3 |
|---|---|---|---|
| RED. | 0.0000 | −0.0200 | −0.1325 |
| OBJ. DIST. | INF. | 4304.835 | 700.000 |
| D1 | 8.913 | 10.360 | 18.943 |
| D2 | 16.408 | 14.961 | 6.378 |

Figure 24:
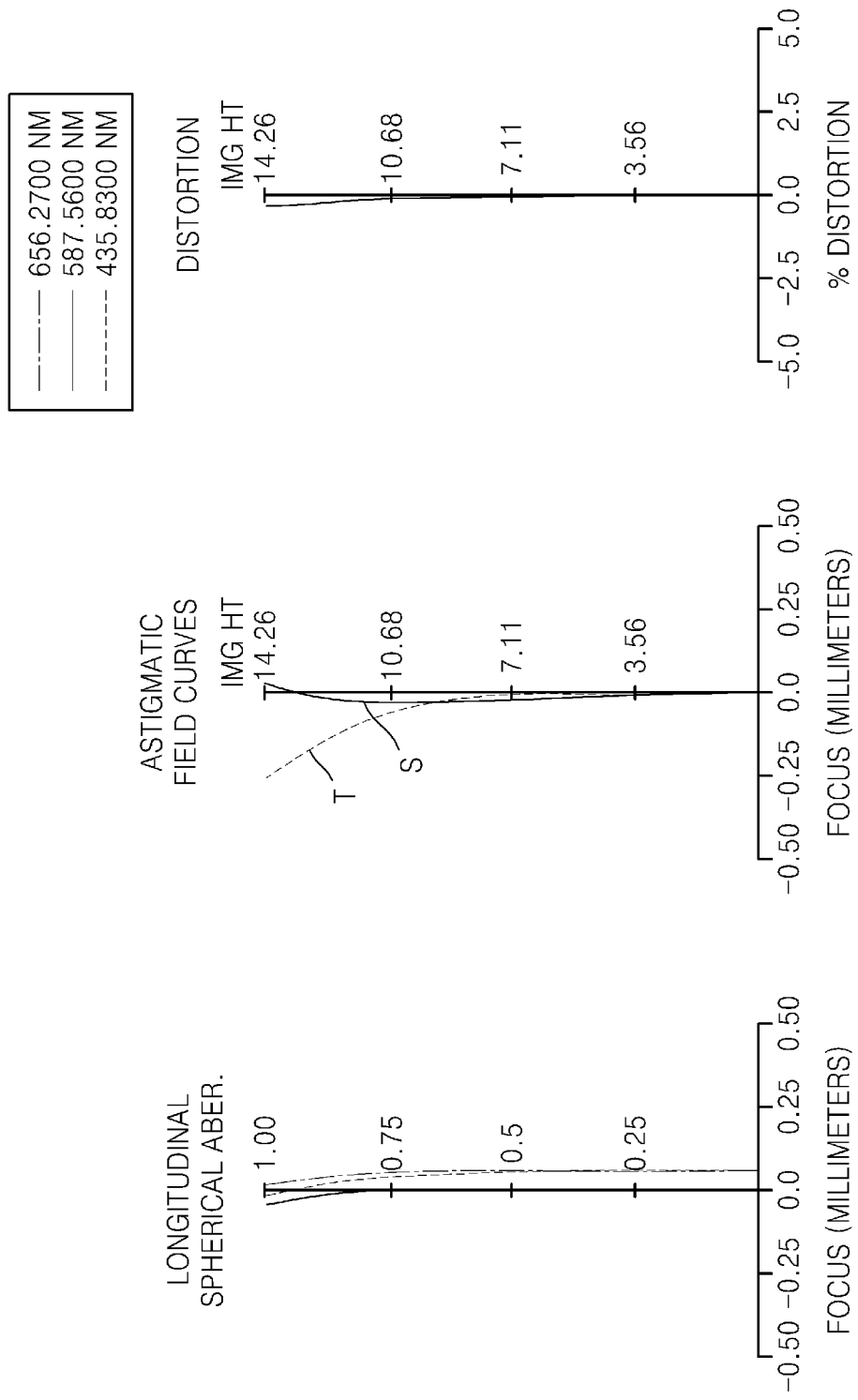
FIG. 24 is aberration diagrams showing longitudinal spherical aberration, astigmatic field curves and distortion in the telephoto lens system according to the fourth embodiment of the invention at an infinite object position.
Figure 25:
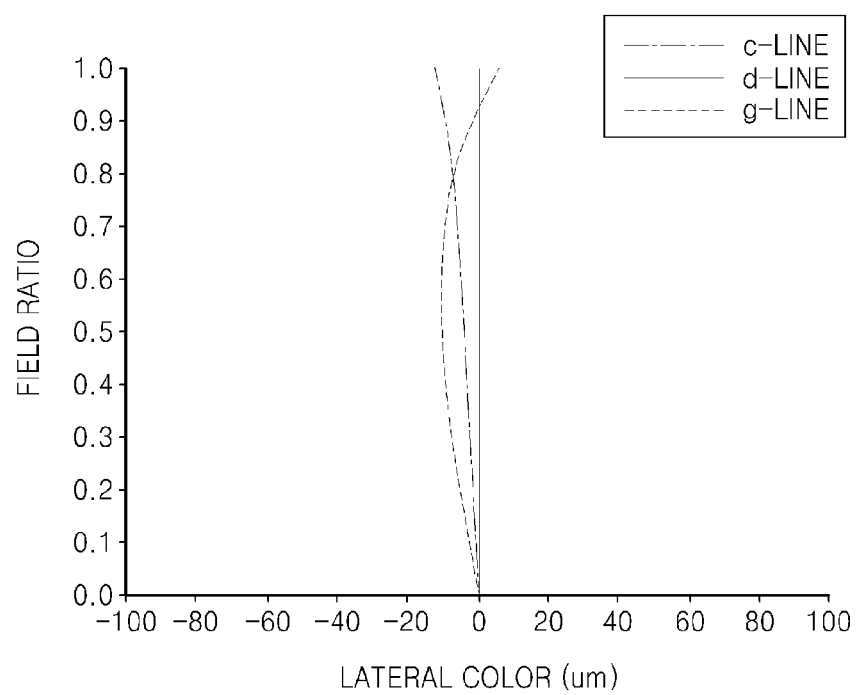
FIG. 25 is an aberration diagram showing lateral chromatic aberration in the telephoto lens system according to the fourth embodiment of the invention at an infinite object position.
Figure 26:
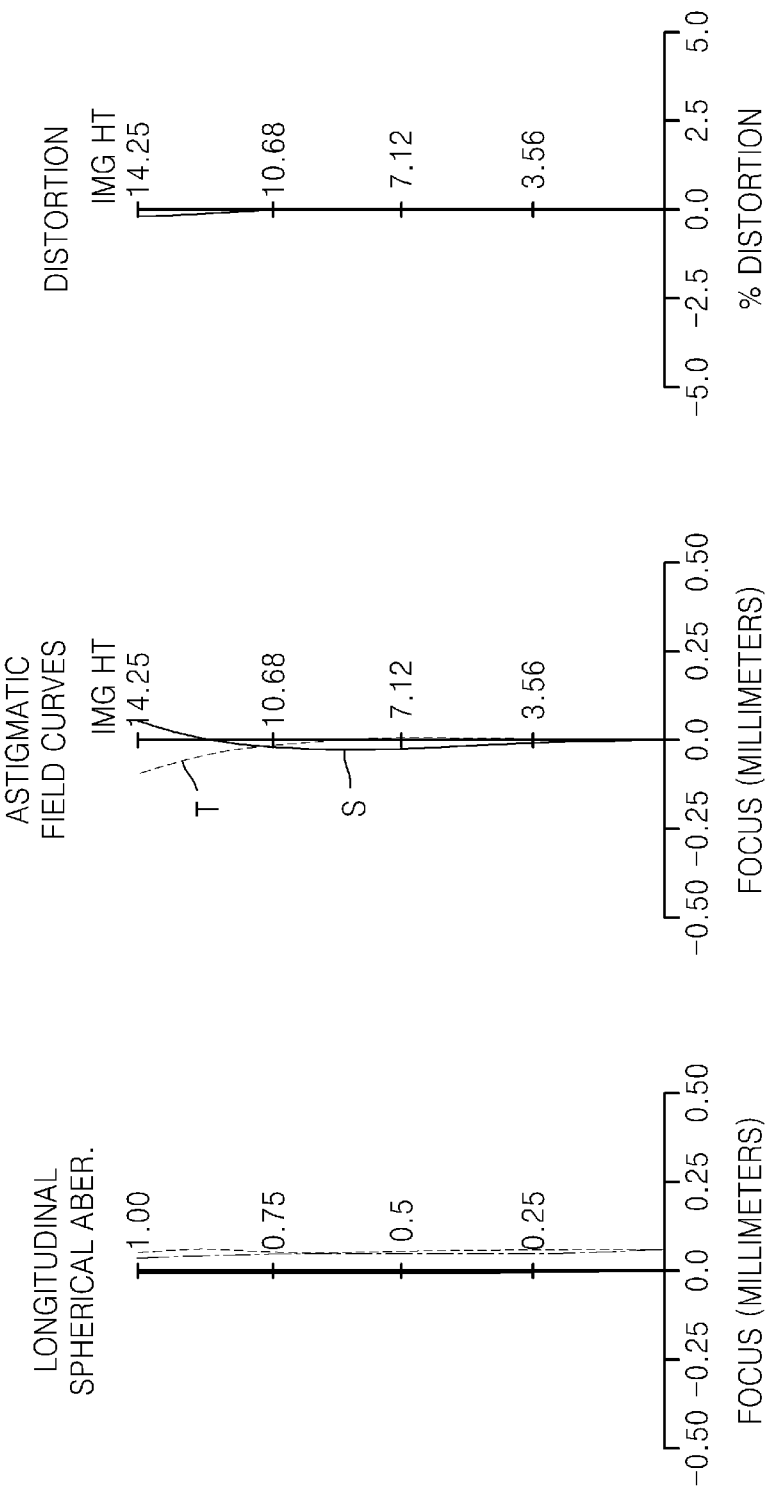
FIG. 26 is aberration diagrams showing longitudinal spherical aberration, astigmatic field curves and distortion in the telephoto lens system according to the fourth embodiment of the invention when an object position is 1/50 magnification position.
Figure 27:
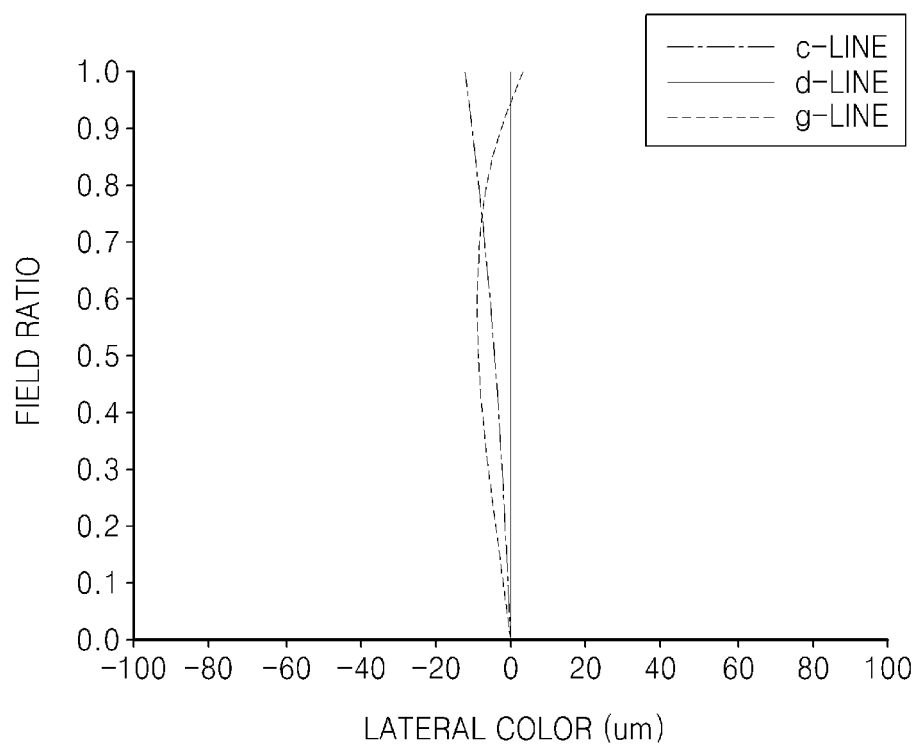
FIG. 27 is an aberration diagram showing lateral chromatic aberration in the telephoto lens system according to the fourth embodiment of the invention when an object position is 1/50 magnification position.
Figure 28:
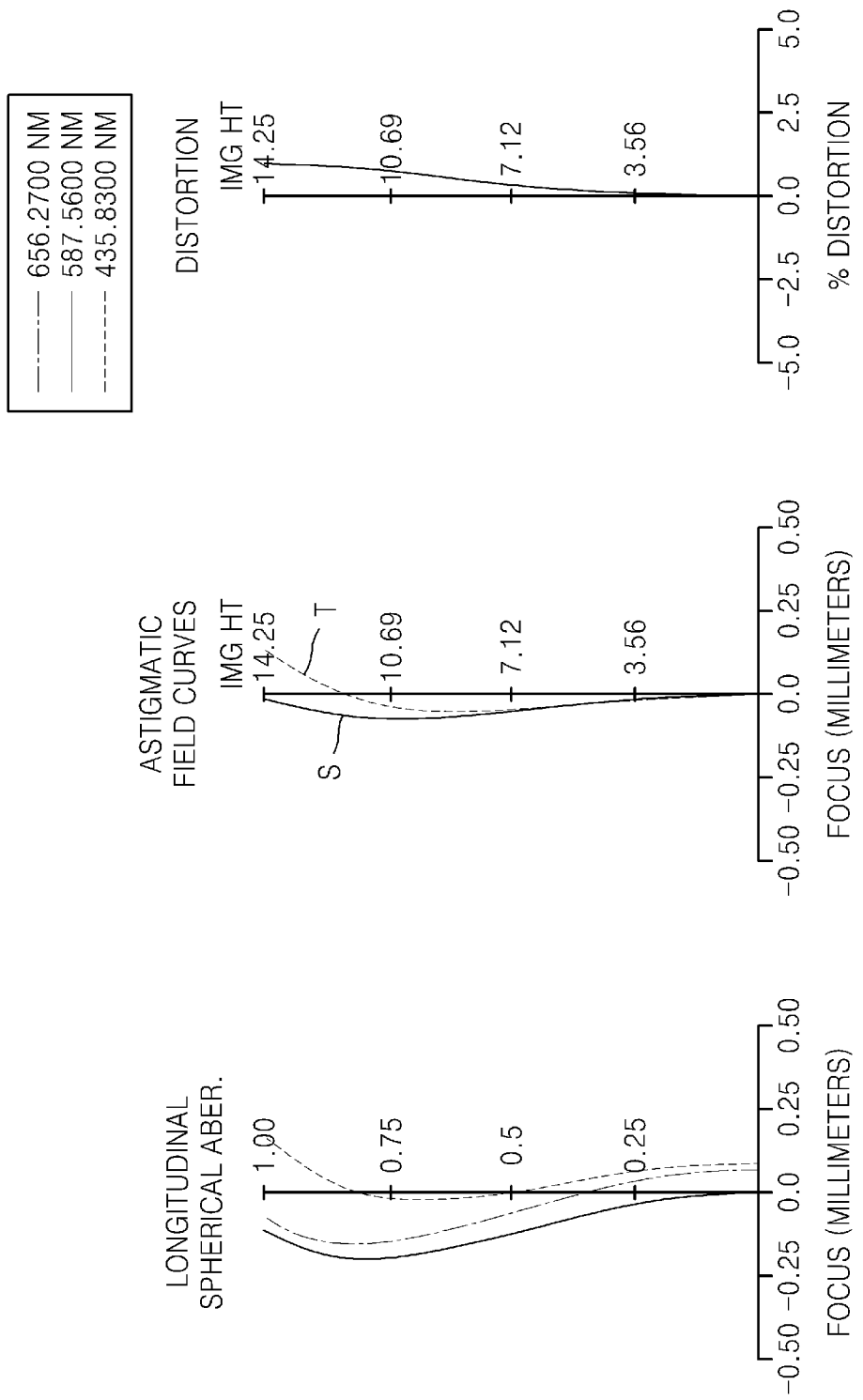
FIG. 28 is aberration diagrams showing longitudinal spherical aberration, astigmatic field curves and distortion in the telephoto lens system according to the fourth embodiment of the invention when an object position is at the closest position.
Figure 29:
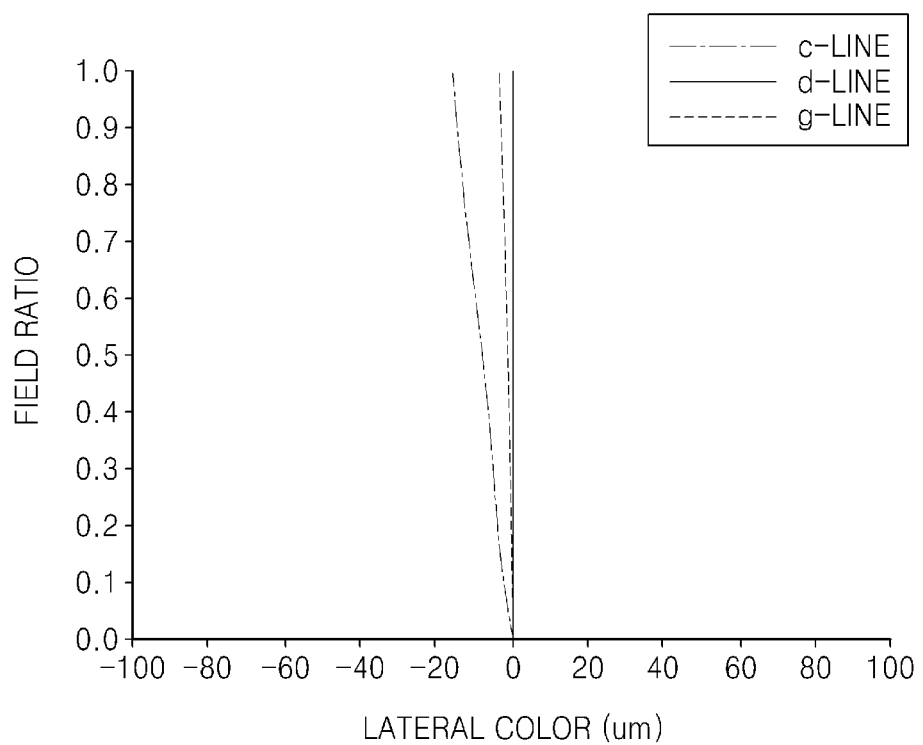
FIG. 29 is an aberration diagram showing lateral chromatic aberration in the telephoto lens system according to the fourth embodiment of the invention when an object position is at the closest position.

FIGS. 24, 26, and 28 are aberration diagrams showing longitudinal spherical aberrations and astigmatic field curves in a telephoto lens system according to the fourth embodiment of the invention when an object position is Pos1, Pos2, and Pos3, respectively. FIGS. 25, 27, and 29 are aberration diagrams showing lateral chromatic aberrations in a telephoto lens system according to the fourth embodiment of the invention when an object position is Pos1, Pos2, and Pos3, respectively.

<Fifth Embodiment>

Figure 30:
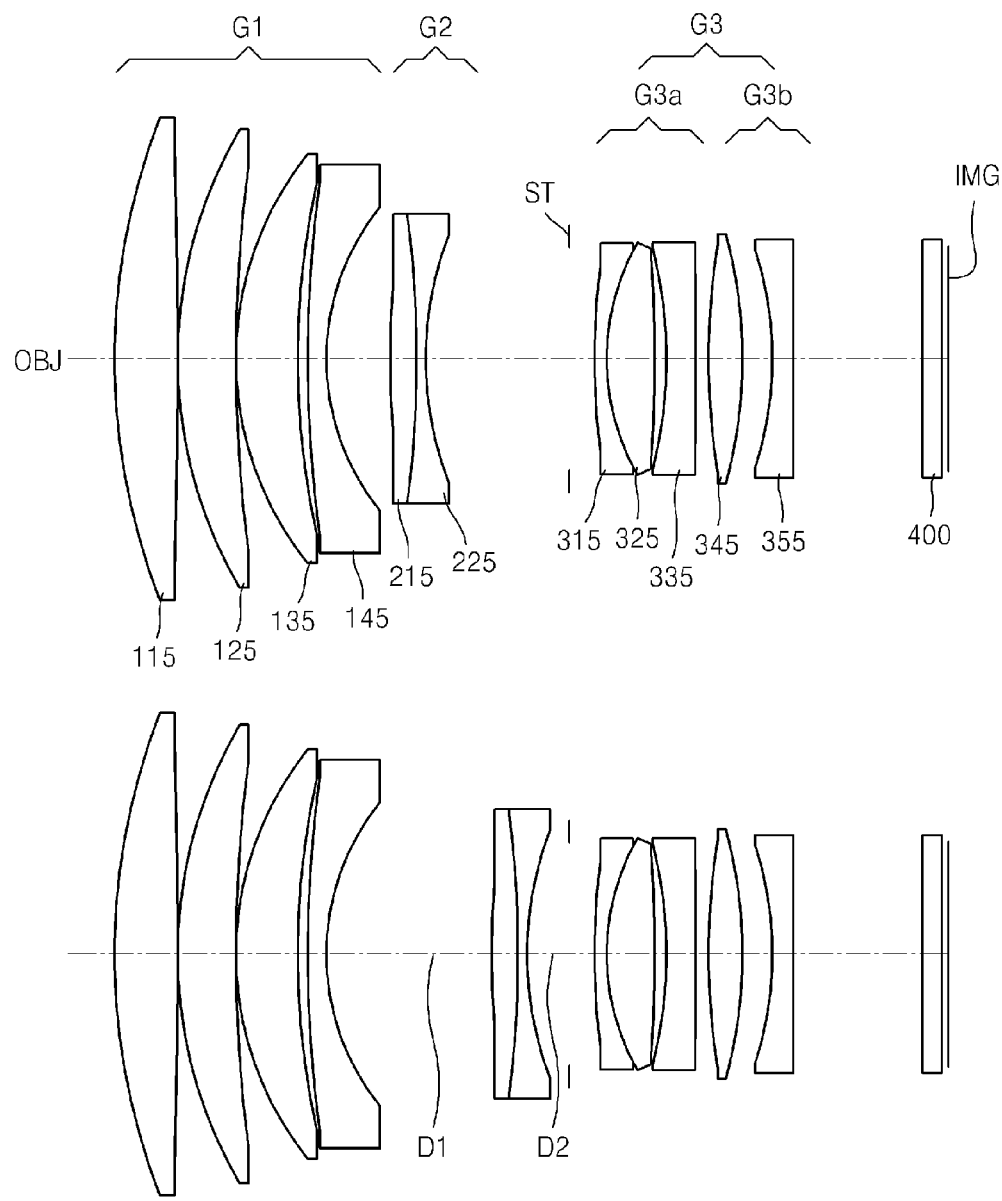
FIG. 30 shows optical arrangements of a telephoto lens system according to a fifth embodiment of the invention at an infinite position and at a closest position.

FIG. 30 shows optical arrangements of a telephoto lens system according to a fifth embodiment of the invention. The telephoto lens system includes the first lens group G1 having a positive refractive power, the second lens group G2 having a negative refractive power, and a third lens group G3 having a positive refractive power. The first lens group G1 includes a first lens 115 as a positive lens, a second lens 125 as a positive lens, a third lens 135 as a negative lens, and a fourth lens 145 as a positive lens. The second lens group G2 includes a fifth lens 215 as a positive lens, and a sixth lens 225 as a negative lens. The fifth lens 215 and the sixth lens 225 are adhered to each other and form a doublet lens. The third lens group G3 includes the 3a sub-lens group G3-a and the 3b sub-lens group G3-b. The 3a sub-lens group G3-a includes a seventh lens 315 as a negative lens, an eighth lens 325 as a positive lens, and a ninth lens 335 as a negative lens, where the seventh lens 315 and the eighth lens 325 are adhere to each other and form a doublet lens. The 3b sub-lens group G3-b includes a tenth lens 345 as a positive lens, and an eleventh lens 355 as a negative lens. Lens data is as shown below.

| EFL 84.48 | | | | |
| FNO 1.44 | | | | |
| Surf | R | D | Nd | Vd |
| 1 | 81.547 | 8.428 | 1.49700 | 81.6 |
| 2 | −1130.660 | 0.100 | | |
| 3 | 56.023 | 7.804 | 1.49700 | 81.6 |
| 4 | 208.933 | 0.100 | | |
| 5 | 40.209 | 8.425 | 1.80420 | 46.5 |
| 6 | 110.263 | 1.180 | | |
| 7 | 178.204 | 2.500 | 1.72825 | 28.3 |
| 8 | 29.845 | 8.856 | | |
| 9 | 582.447 | 3.226 | 1.84666 | 23.8 |
| 10 | −135.665 | 1.500 | 1.74400 | 44.9 |
| 11 | 43.352 | 19.544 | | |
| 12 | Infinity | 3.403 | | (STOP) |
| 13 | 137.971 | 1.500 | 1.62004 | 36.3 |
| 14 | 27.463 | 6.645 | 1.83481 | 42.7 |
| 15 | −116.833 | 1.418 | | |
| 16 | −54.872 | 4.333 | 1.62588 | 35.7 |
| 17 | −175.705 | 1.474 | | |
| 18 | 99.865 | 4.500 | 1.83400 | 37.3 |
| 19 | −61.446 | 4.316 | | |
| 20 | −44.291 | 2.654 | 1.84666 | 23.8 |
| 21 | −847.695 | 17.656 | | |
| 22 | Infinity | 2.800 | 1.51680 | 64.2 (Filter) |
| 23 | Infinity | 0.524 | | |

TABLE 5

| | Pos1 | Pos2 | Pos3 |
| RED. | 0.0000 | −0.0200 | −0.1345 |
| OBJ. DIST. | INF. | 4286.051 | 687.115 |
| D1 | 8.856 | 10.784 | 22.746 |
| D2 | 19.544 | 17.616 | 5.654 |

Figure 31:
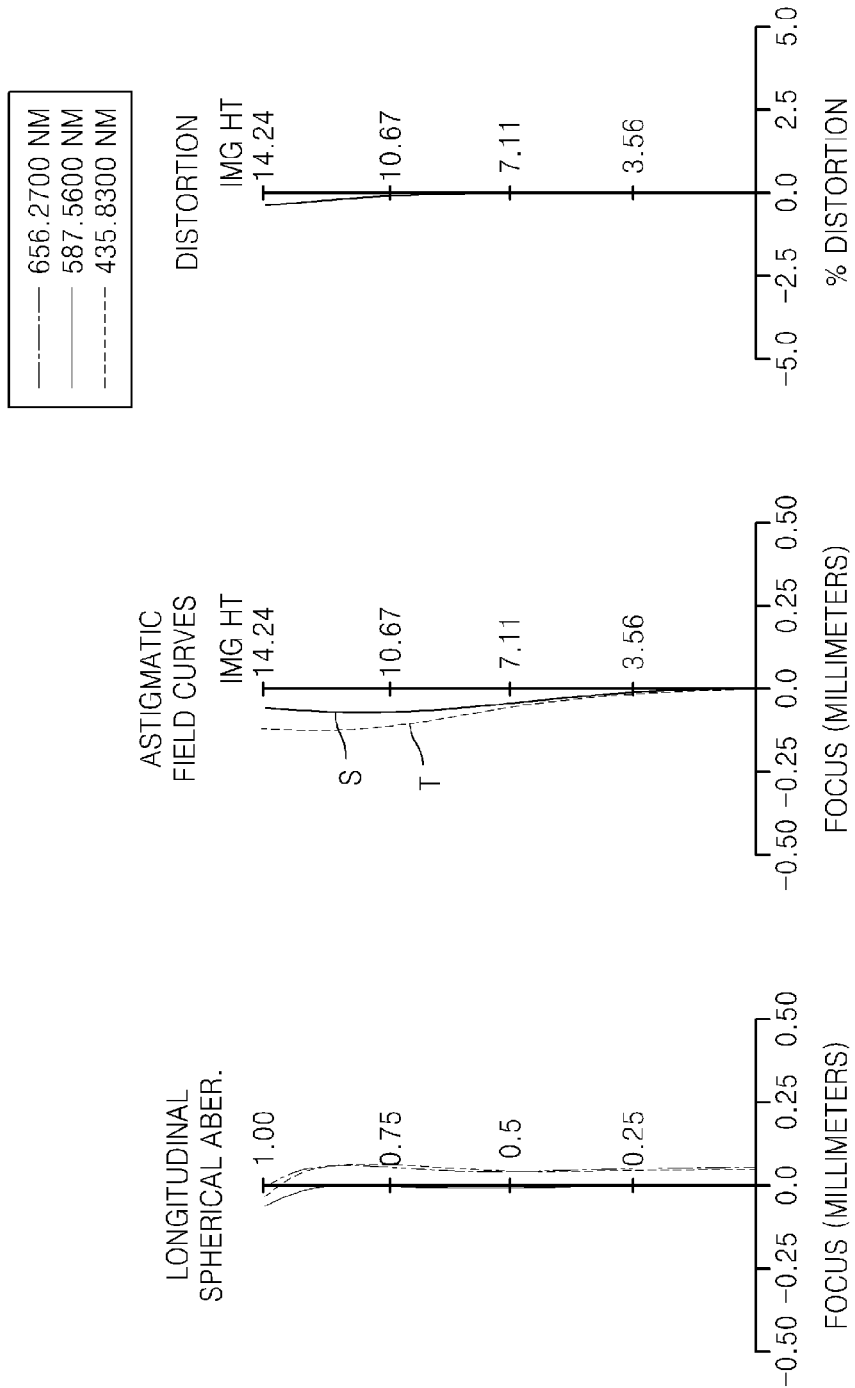
FIG. 31 is aberration diagrams showing longitudinal spherical aberration, astigmatic field curves and distortion in the telephoto lens system according to the fifth embodiment of the invention at an infinite object position.
Figure 32:
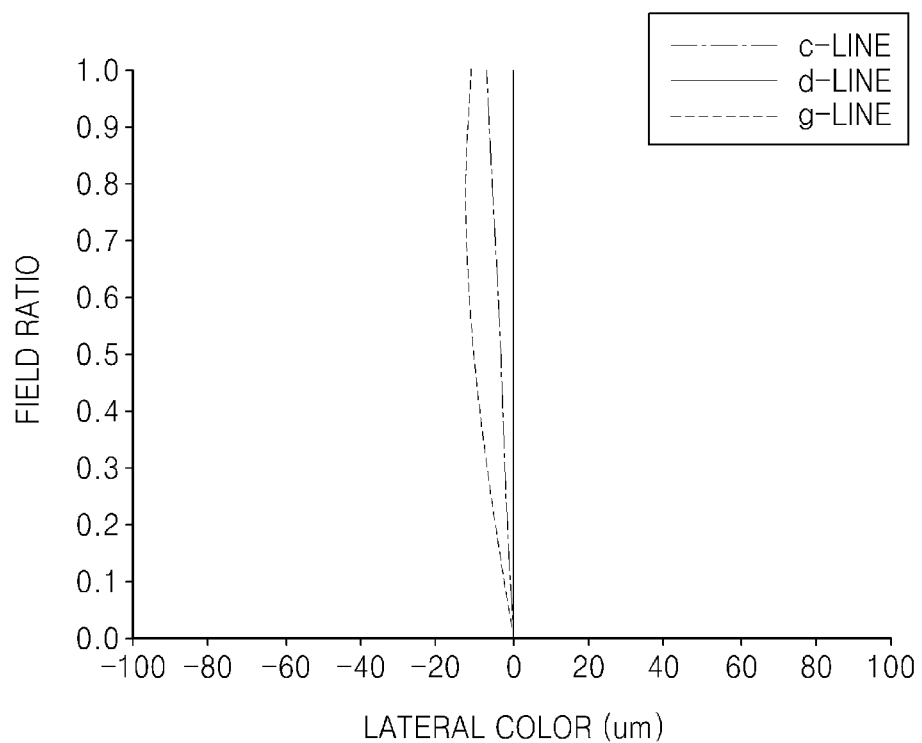
FIG. 32 is an aberration diagram showing lateral chromatic aberration in the telephoto lens system according to the fifth embodiment of the invention at an infinite object position.
Figure 33:
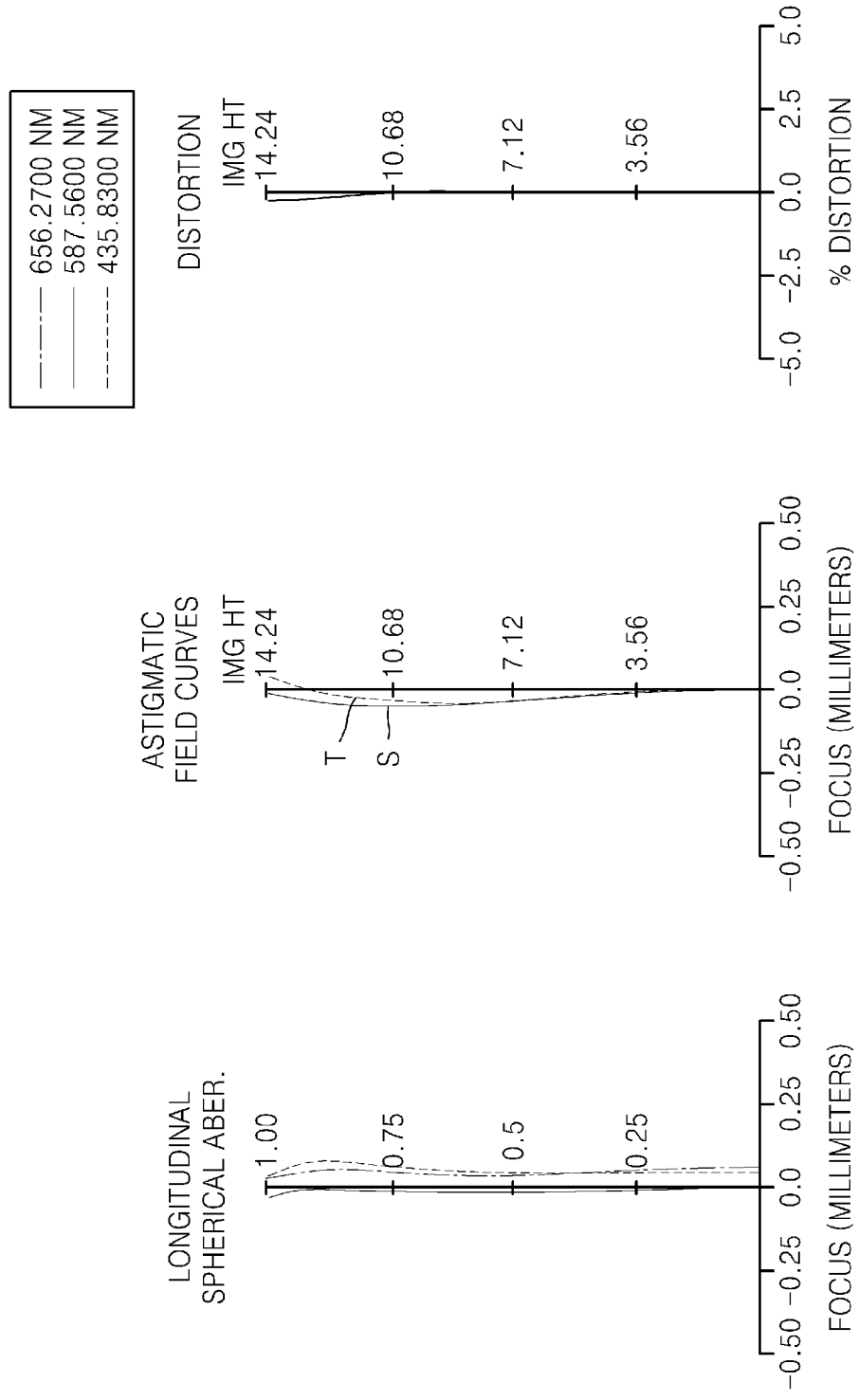
FIG. 33 is aberration diagrams showing longitudinal spherical aberration, astigmatic field curves and distortion in the telephoto lens system according to the fifth embodiment of the invention when an object position is 1/50 magnification position.
Figure 34:
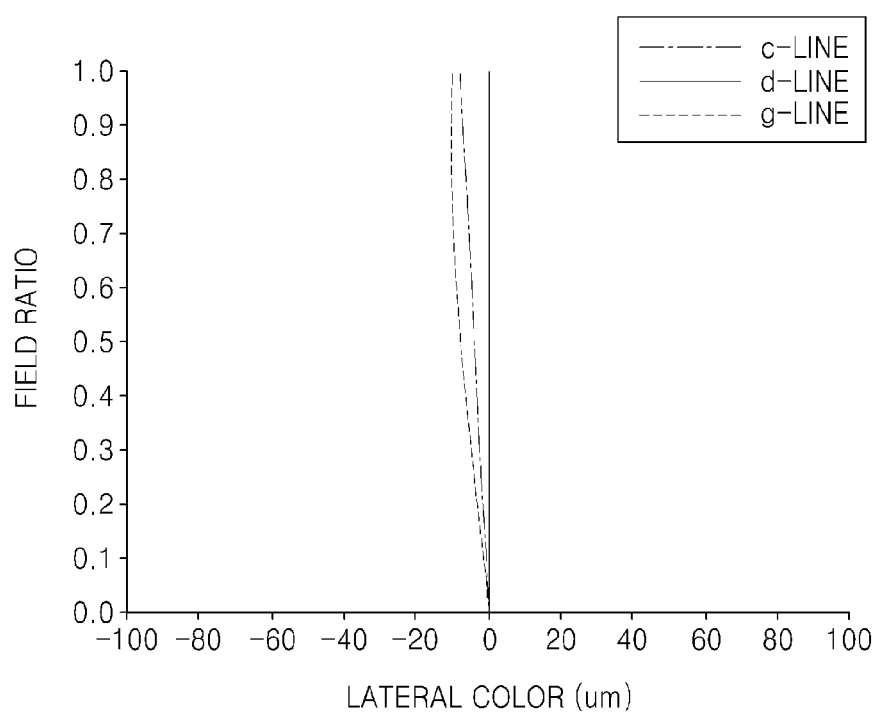
FIG. 34 is an aberration diagram showing lateral chromatic aberration in the telephoto lens system according to the fifth embodiment of the invention when an object position is 1/50 magnification position.
Figure 35:
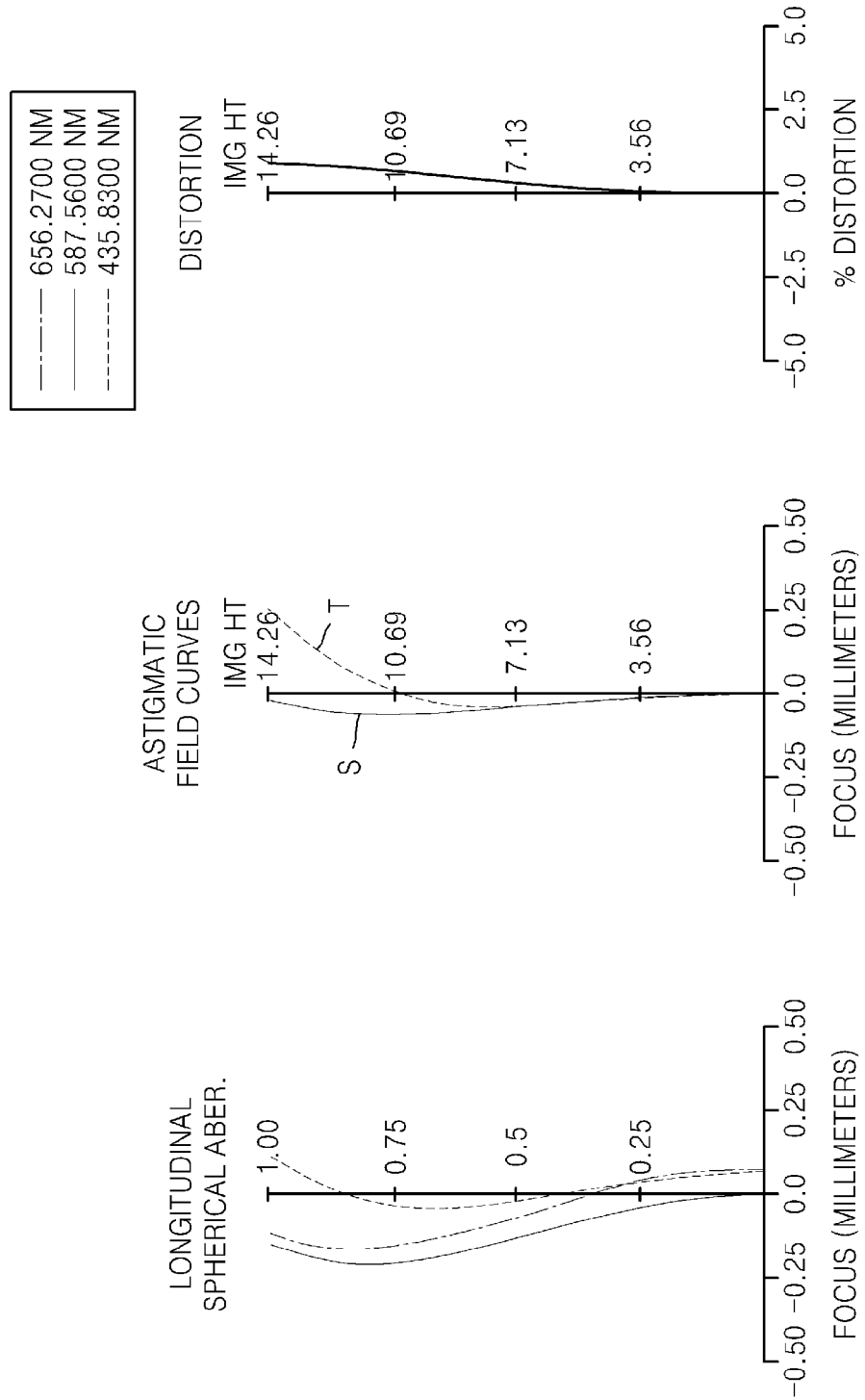
FIG. 35 is aberration diagrams showing longitudinal spherical aberration, astigmatic field curves and distortion in the telephoto lens system according to the fifth embodiment of the invention when an object position is at the closest position.
Figure 36:
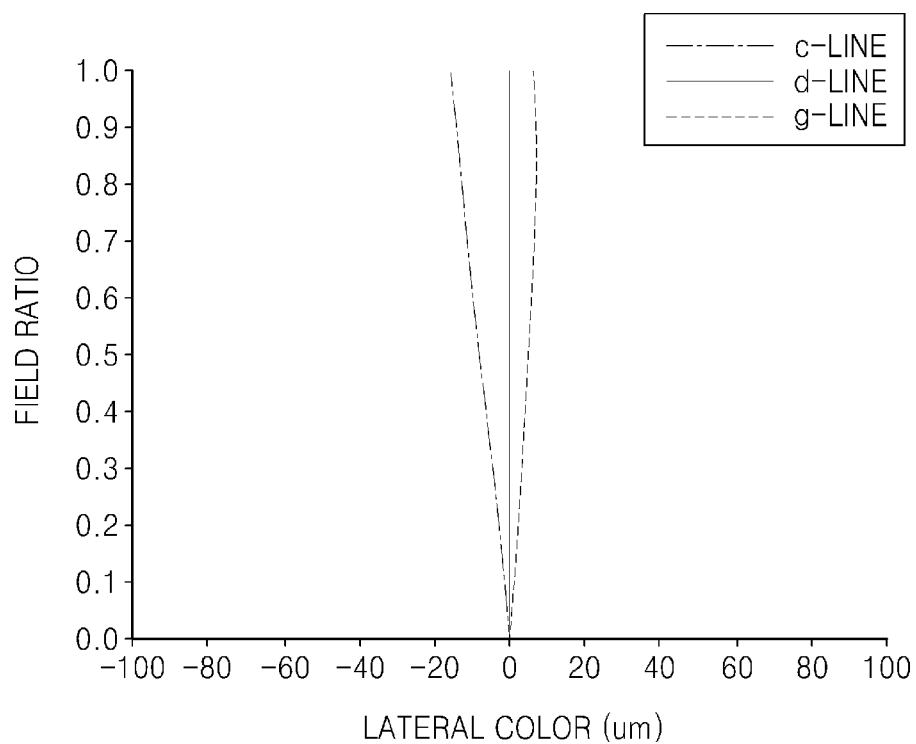
FIG. 36 is an aberration diagram showing lateral chromatic aberration in the telephoto lens system according to the fifth embodiment of the invention when an object position is at the closest position.

FIGS. 31, 33, and 35 are aberration diagrams showing longitudinal spherical aberrations and astigmatic field curves in a telephoto lens system according to the fifth embodiment of the invention when an object position is Pos1, Pos2, and Pos3, respectively. FIGS. 32, 34, and 36 are aberration diagrams showing lateral chromatic aberrations in a telephoto lens system according to the fifth embodiment of the invention when an object position is Pos1, Pos2, and Pos3, respectively.

<Sixth Embodiment>

Figure 37:
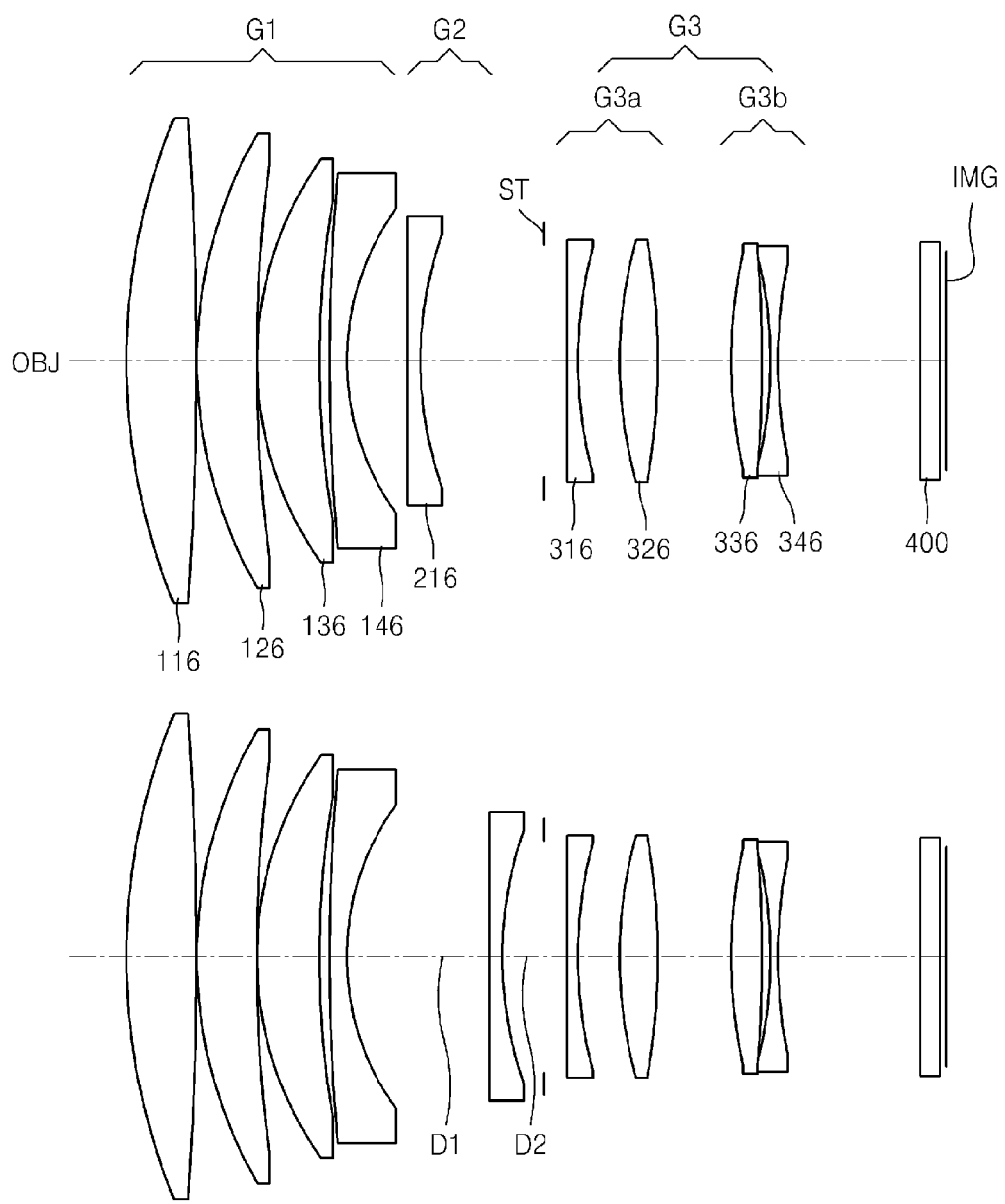
FIG. 37 shows optical arrangements of a telephoto lens system according to a sixth embodiment of the invention at an infinite position and at a closest position.

FIG. 37 shows optical arrangements of a telephoto lens system according to a sixth embodiment of the invention. The telephoto lens system includes the first lens group G1 having a positive refractive power, the second lens group G2 having a negative refractive power, and a third lens group G3 having a positive refractive power. The first lens group G1 includes a first lens 116 as a positive lens, a second lens 126 as a positive lens, a third lens 136 as a negative lens, and a fourth lens 146 as a positive lens. The second lens group G2 includes a fifth lens 226 as a negative lens. The third lens group G3 includes the 3a sub-lens group G3-a and the 3b sub-lens group G3-b. The 3a sub-lens group G3-a includes a seventh lens 316 as a negative lens, and an eighth lens 326 as a positive lens. The 3b sub-lens group G3-b includes a ninth lens 336 as a positive lens, and a tenth lens 346 as a negative lens. Lens data is as shown below.

| EFL | 84.91 | | | |
| FNO | 1.44 | | | |
| Surf | R | D | Nd | Vd |
| 1 | 81.884 | 9.139 | 1.49700 | 81.6 |
| 2 | −409.475 | 0.100 | | |
| 3 | 55.174 | 8.080 | 1.49700 | 81.6 |
| 4 | 237.497 | 0.100 | | |
| 5 | 42.538 | 8.224 | 1.80420 | 46.5 |
| 6 | 124.196 | 1.292 | | |
| 7 | 249.198 | 2.500 | 1.74077 | 27.8 |
| 8 | 32.635 | 8.499 | | |
| 9 | −1077.765 | 1.500 | 1.69680 | 55.5 |
| 10 | 43.949 | 16.995 | | |
| 11 | Infinity | 2.952 | | (STOP) |
| 12 | 2189.560 | 1.500 | 1.54814 | 45.8 |
| 13 | 58.441 | 5.580 | | |
| 14 | 49.675 | 5.148 | 1.83400 | 37.3 |
| 15 | −88.946 | 9.889 | | |
| 16 | 53.063 | 4.500 | 1.80420 | 46.5 |
| 17 | −140.138 | 0.948 | | |
| 18 | −63.044 | 1.300 | 1.84666 | 23.8 |
| 19 | 77.185 | 19.225 | | |
| 20 | Infinity | 2.800 | 1.51680 | 64.2 (Filter) |
| 21 | Infinity | 0.525 | | |

TABLE 6

| | Pos1 | Pos2 | Pos3 |
| RED. | 0.0000 | −0.0200 | −0.1340 |
| OBJ. DIST. | INF. | 4302.846 | 689.205 |
| D1 | 8.499 | 10.074 | 19.650 |
| D2 | 16.995 | 15.420 | 5.844 |

Figure 38:
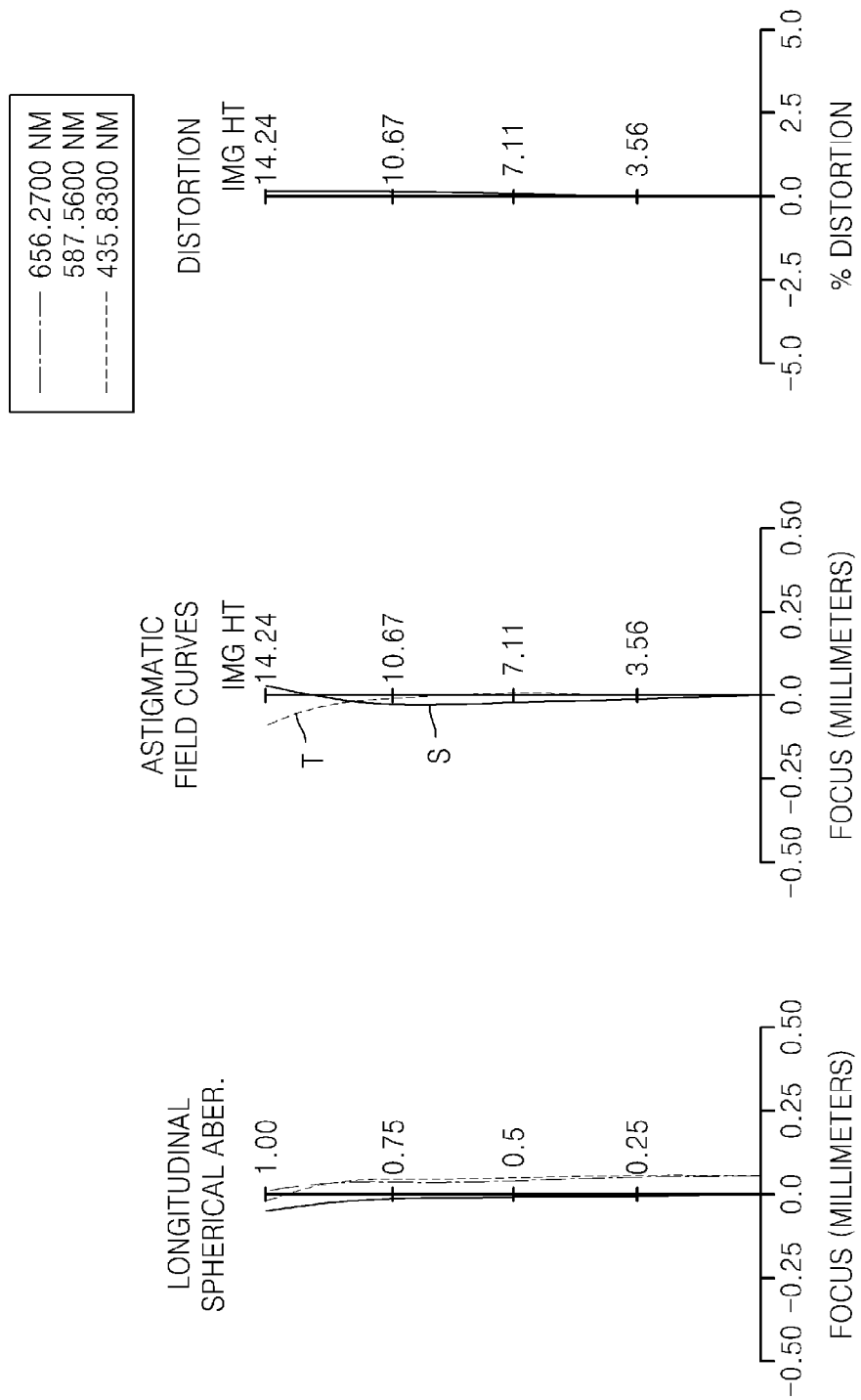
FIG. 38 is aberration diagrams showing longitudinal spherical aberration, astigmatic field curves and distortion in the telephoto lens system according to the sixth embodiment of the invention at an infinite object position.
Figure 39:
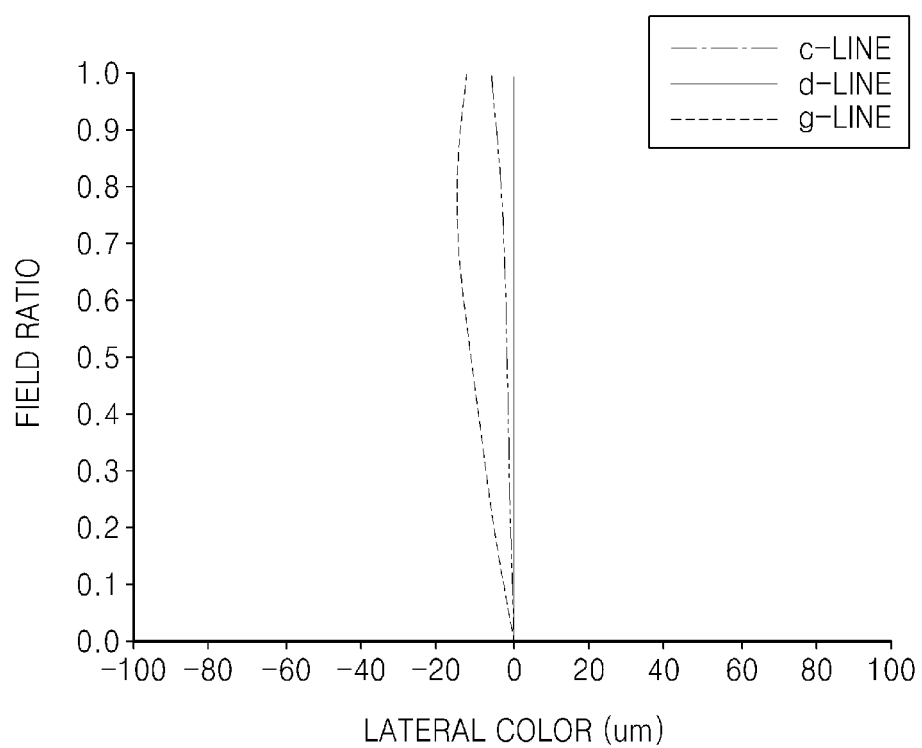
FIG. 39 is an aberration diagram showing lateral chromatic aberration in the telephoto lens system according to the sixth embodiment of the invention at an infinite object position.
Figure 40:
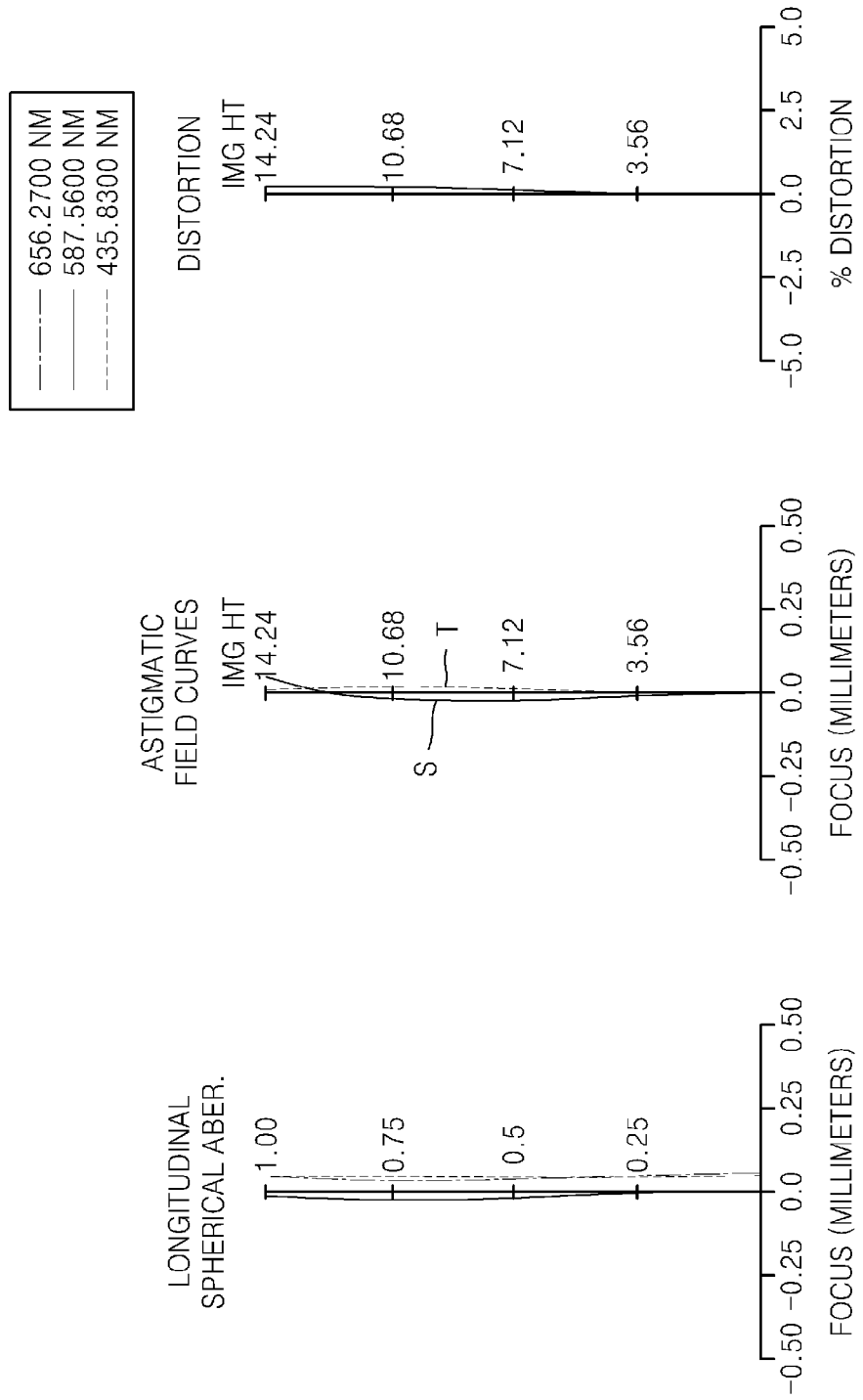
FIG. 40 is aberration diagrams showing longitudinal spherical aberration, astigmatic field curves and distortion in the telephoto lens system according to the sixth embodiment of the invention when an object position is 1/50 magnification position.
Figure 41:
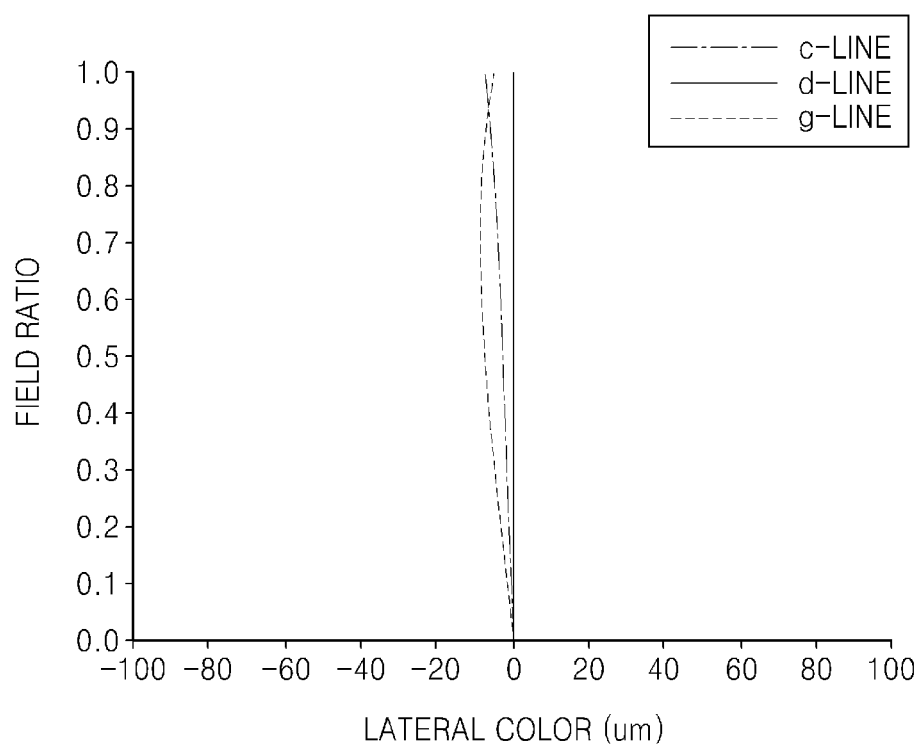
FIG. 41 is an aberration diagram showing lateral chromatic aberration in the telephoto lens system according to the sixth embodiment of the invention when an object position is 1/50 magnification position.
Figure 42:
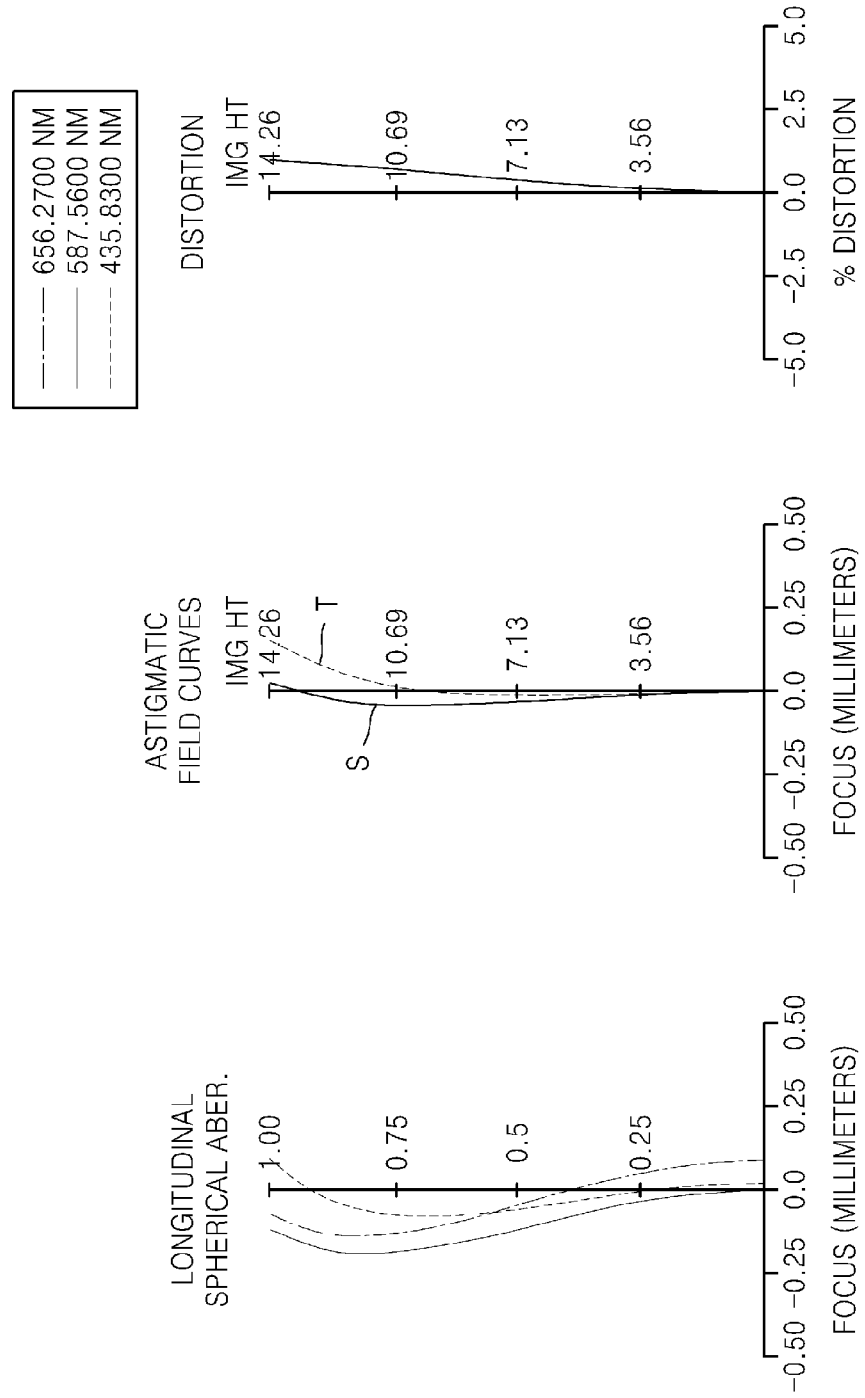
FIG. 42 is aberration diagrams showing longitudinal spherical aberration, astigmatic field curves and distortion in the telephoto lens system according to the sixth embodiment of the invention when an object position is at the closest position.
Figure 43:
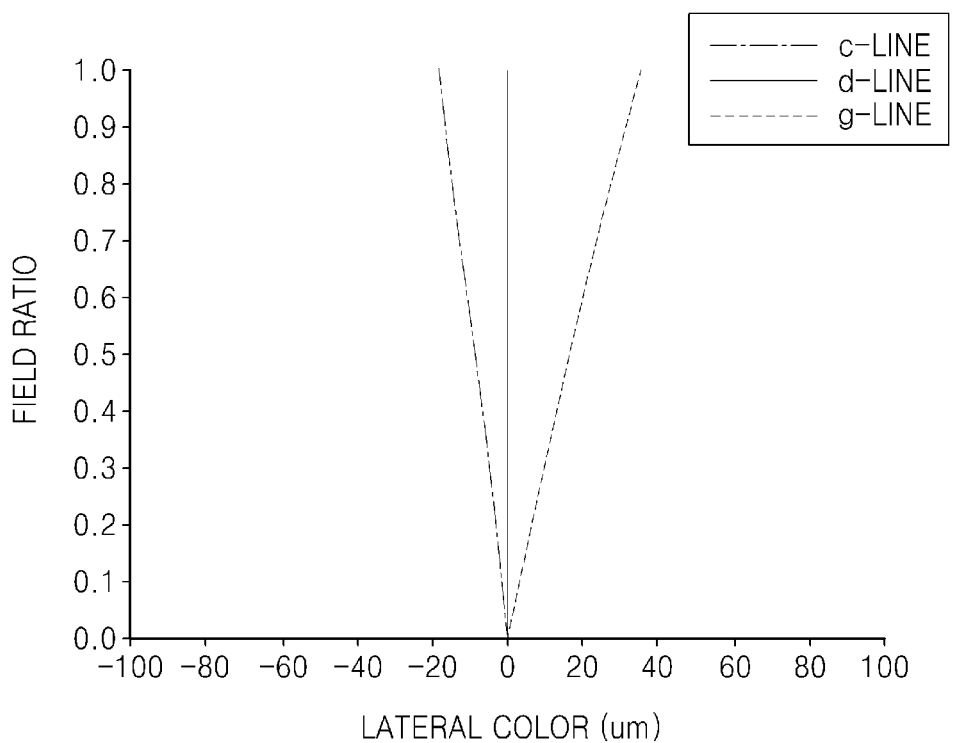
FIG. 43 is an aberration diagram showing lateral chromatic aberration in the telephoto lens system according to the sixth embodiment of the invention when an object position is at the closest position.

FIGS. 38, 40, and 42 are aberration diagrams showing longitudinal spherical aberrations and astigmatic field curves in a telephoto lens system according to the sixth embodiment of the invention when an object position is Pos1, Pos2, and Pos3, respectively. FIGS. 39, 41, and 43 are aberration diagrams showing lateral chromatic aberrations in a telephoto lens system according to the sixth embodiment of the invention when an object position is Pos1, Pos2, and Pos3, respectively.

Table 7 below shows that the embodiments of the invention satisfy aforementioned conditions.

TABLE 7

| Embodiments | f | fb | fb/f | f3a | f/f3a | f3b_n | f/f3b_n | φ3b_n | φ3b_n × f |
|---|---|---|---|---|---|---|---|---|---|
| 1 | 85.01 | 21.82 | 0.26 | 45.82 | 1.86 | −64.47 | −1.32 | −0.0151 | −1.29 |
| 2 | 84.91 | 20.02 | 0.24 | 73.10 | 1.16 | −55.68 | −1.52 | −0.0216 | −1.84 |
| 3 | 85.01 | 20.99 | 0.25 | 61.25 | 1.39 | −43.27 | −1.96 | −0.0146 | −1.24 |
| 4 | 84.92 | 20.02 | 0.24 | 52.38 | 1.62 | −187.52 | −0.45 | −0.0079 | −0.67 |
| 5 | 84.48 | 20.03 | 0.24 | 85.12 | 0.99 | −55.28 | −1.53 | −0.0191 | −1.61 |
| 6 | 84.91 | 21.60 | 0.25 | 55.12 | 1.54 | −40.81 | −2.08 | −0.0134 | −1.14 |

The above embodiments provide relatively bright telephoto lenses that are inner-focusing types suitable for auto-focusing cameras and have f numbers around 1.4. The telephoto lenses according to the above embodiments prevent increases of sizes thereof by lowering heights at which light enters a unit for coupling a lens and a camera. Furthermore, the telephoto lenses according to the above embodiments may embody hand shake correction, even though the telephoto lenses are relatively bright telephoto lenses with small f numbers.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A telephoto lens system comprising:
    a first lens group having a positive refractive power and comprising at least three positive lenses and one negative lens;
    a second lens group having a negative refractive power and performs focusing by moving along the optical axis; and
    a third lens group having a positive refractive power and comprising a 3a sub-lens group with positive refractive power and a 3b sub-lens group,
    wherein:
        the 3a sub-lens group comprises a negative lens and a positive lens sequentially arranged from an object side,
        the 3b sub-lens group comprises a positive lens and a negative lens sequentially arranged from the object side, and
        the telephoto lens system satisfies the condition, $0.17 < fb/f < 0.35$, where, fb indicates the back focal length in air without a filter, that is, the distance from the lens surface of the telephoto lens system closest to the image side to the imaging surface with respect to the telephoto lens system having an optical arrangement at an infinite object position in air without the filter, and f indicates the overall focal length of the telephoto lens system.

2. The telephoto lens system of claim 1, wherein the second lens group comprises a doublet lens formed by adhering a positive lens and a negative lens to each other.

3. The telephoto lens system of claim 1, wherein the second lens group comprises a negative lens.

4. The telephoto lens system of claim 1, further satisfying the condition, $0.50 < f/f3a < 2.00$, where f indicates the overall focal length of the telephoto lens system, and f3a indicates the focal length of the 3a sub-lens group.

5. The telephoto lens system of claim 1, further satisfying the condition, $-3.00 < f/f3b\_n < -0.25$, where f indicates the overall focal length of the telephoto lens system, and f3b_n indicates the focal length of the negative lens in the 3b sub-lens group of the third lens group.

6. The telephoto lens system of claim 1, further satisfying the condition, $-3.00 < \phi 3b\_n \times f < -0.30$, where f indicates the overall focal length of the telephoto lens system and φ3b_n indicates the refractive power of the surface of the negative lens of the 3b sub-lens group of the third lens group having a relatively high negative refractive power and the φ3b_n is defined as follows:

$$\phi 3b\_n = -|(n3b\_n - 1)/r3b|$$

where, n3b_n indicates the refractive index of the negative lens of the 3b sub-lens group, and r3b indicates the radius of curvature of one of the surfaces of the negative lens of the 3b sub-lens group of the third lens group having the relatively high negative refractive power.

7. The telephoto lens system of claim 1, wherein the surface of a lens of the third lens group closest to the object side has a shape convex toward the object side.

8. The telephoto lens system of claim 1, wherein the 3a sub-lens group moves in a direction crossing the optical axis to correct hand shakes.

9. The telephoto lens system of claim 8, wherein the negative lens and the positive lens of the 3a sub-lens group form a doublet lens, and
    the 3a sub-lens group further comprising a negative lens arranged in the image side of the doublet lens.

* * * * *